(12) United States Patent
Fuchu

(10) Patent No.: US 6,314,326 B1
(45) Date of Patent: *Nov. 6, 2001

(54) ELECTRONIC EQUIPMENT CONTROL APPARATUS, ELECTRONIC EQUIPMENT CONTROL METHOD AND ELECTRONIC EQUIPMENT

(75) Inventor: Katsuki Fuchu, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,730

(22) Filed: Feb. 9, 1998

(30) Foreign Application Priority Data

Feb. 17, 1997 (JP) .................................... 9-031577

(51) Int. Cl.$^7$ ..................................... G05B 11/01
(52) U.S. Cl. ....................................... 700/17; 340/825.06
(58) Field of Search ................... 700/19, 17, 83; 340/825.06, 825.07, 825.15

(56) References Cited

U.S. PATENT DOCUMENTS

| 4,652,874 | 3/1987 | Loyer | 340/825.05 |
| 4,723,120 | 2/1988 | Petty, Jr. | 340/825.02 |
| 4,903,016 | 2/1990 | Murai et al. | 340/825.07 |

(List continued on next page.)

FOREIGN PATENT DOCUMENTS

| 31 51 492 A1 | 7/1983 | (DE) | H04N/5/44 |
| 0 727 729 A1 | 8/1996 | (EP) | G06F/1/32 |
| 0626635 A2 | 11/1994 | (EP) | G06F/3/00 |
| 0 371 719 A2 | 6/1990 | (EP) | H04B/1/20 |
| 0 573 204 A2 | 12/1993 | (EP) | H04L/12/40 |
| 0637157 A2 | 2/1995 | (EP) | H04L/29/06 |
| 7-134628 | 5/1995 | (JP) | G06F/1/31 |
| 4-97468 | 3/1992 | (JP) | G06F/13/14 |
| WO 96/07971 | 3/1996 | (WO) | G06F/13/38 |

OTHER PUBLICATIONS

A. Gefrides et al., "Standard Bus Connects Up To 126 Periperals: Plug and Play With USB", Applications Connectors, May 1996, pp. 36–38.
D. Bursky, "Networking Scheme Exploits Existing RS–232 Interface," Electronic Design, vol. 35, No. 13, May 1987., pp. 65–68.
G. Hoffman et al., "IEEE 1394: A Ubiquitous Bus," IEEE 1995, Published Mar. 5, 1995, pp. 334–338.
IEEE Standard For A High Performance Serial Bus, IEEE Computer Society STD. 1394–1995, Aug. 30, 1996, pp. iii.iv; 1–47 and 113–252.

*Primary Examiner*—Paul P. Gordon
*Assistant Examiner*—Zoila Cabrera
(74) *Attorney, Agent, or Firm*—Oblon, Spivak, McClelland, Maier & Neustadt, P.C.

(57) ABSTRACT

An electronic equipment control apparatus is connected to one or more pieces of external electronic equipment by communication lines and used for controlling the electronic equipment through the communication lines. The electronic equipment control apparatus comprises a communication portions for communication with the pieces of external electronic equipment through the communication lines; control portion for controlling operations to request the pieces of external electronic equipment to transmit user interface information, for controlling the pieces of external electronic equipment, to the electronic equipment control apparatus; and storage portion for storing the user interface information transmitted by the pieces of external electronic equipment through the communication lines. In the electronic equipment control apparatus, it is not necessary for the user to perform operations to install software, that is, the user interface information required for controlling the external electronic equipment from the PC module, on the PC module in order to control the external electronic equipment from the PC module.

68 Claims, 15 Drawing Sheets

U.S. PATENT DOCUMENTS

| | | | |
|---|---|---|---|
| 5,007,051 | 4/1991 | Dolkas et al. | 370/85.1 |
| 5,400,246 * | 3/1995 | Wilson et al. | 700/17 |
| 5,410,326 * | 4/1995 | Goldstein | 348/734 |
| 5,418,527 * | 5/1995 | Yashiro | 340/825.24 |
| 5,420,724 | 5/1995 | Kawamura et al. | 360/13 |
| 5,455,569 | 10/1995 | Sherman et al. | 340/825.02 |
| 5,475,835 * | 12/1995 | Hickey | 707/104 |
| 5,481,750 | 1/1996 | Parise et al. | 395/800 |
| 5,515,211 | 5/1996 | Kawamura | 360/14.2 |
| 5,537,605 | 7/1996 | Teece | 712/1 |
| 5,539,390 | 7/1996 | Nagano et al. | 340/825.07 |
| 5,657,221 | 8/1997 | Warman et al. | 364/188 |
| 5,687,334 | 11/1997 | Davis et al. | 395/339 |
| 5,712,834 | 1/1998 | Nagano et al. | 369/19 |
| 5,729,717 | 3/1998 | Tamada et al. | 395/491 |
| 5,778,064 | 7/1998 | Kori et al. | 380/5 |
| 5,787,259 | 7/1998 | Haroun et al. | 395/200.83 |
| 5,790,876 | 8/1998 | Shima et al. | 397/750.03 |
| 5,793,366 | 8/1998 | Mano et al. | 345/329 |
| 5,815,631 | 9/1998 | Sugiyama et al. | 386/46 |
| 5,847,771 | 12/1998 | Cloutier et al. | 348/564 |
| 5,850,573 | 12/1998 | Wada | 395/882 |
| 5,875,108 * | 2/1999 | Hoffberg et al. | 700/17 |
| 5,877,821 * | 3/1999 | Newlin et al. | 348/724 |
| 5,887,573 | 3/1999 | Takahashi | 395/828 |
| 5,900,867 * | 5/1999 | Schindler et al. | 345/327 |
| 5,922,047 * | 7/1999 | Newlin et al. | 709/217 |
| 5,963,450 * | 10/1999 | Dew | 700/169 |
| 5,973,748 | 10/1999 | Horiguchi et al. | 348/554 |
| 5,987,126 | 11/1999 | Okuyama et al. | 380/5 |

* cited by examiner

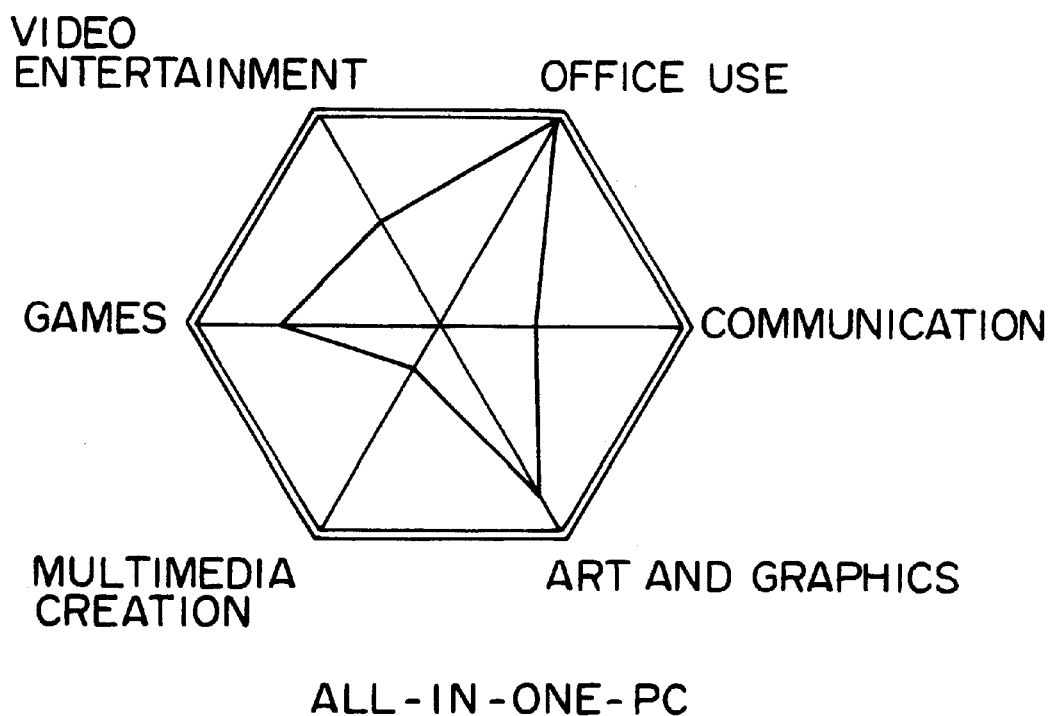

ELECTRONIC EQUIPMENT CONTROL APPARATUS, ELECTRONIC EQUIPMENT CONTROL METHOD AND ELECTRONIC EQUIPMENT

BACKGROUND OF THE INVENTION

In general, the present invention relates to an electronic equipment control apparatus, an electronic equipment control method and an electronic equipment. More particularly, the present invention relates to an electronic equipment control apparatus, an electronic equipment control method and an electronic equipment which improve operability of the electronic equipment control apparatus by requiring no operation to install software for controlling the electronic equipment in the case of a plurality of pieces of such electronic equipment connected to each other and to the electronic equipment control apparatus by communication lines.

In recent years, the personal computer has been becoming popular and is used not only at work places, but also at homes. At many homes, the so-called AV (Audio Visual) equipment such as a television receiver, a cassette deck and a video disk player are also used as well in addition to the personal computer. In such a case, the personal computer is connected to each piece of AV equipment by a home bus, making it possible to control the AV equipment centrally from the personal computer.

As a result, there are more and more cases in which the personal computer is used as a computer generally called an all-in-one computer.

To put it in detail, as shown in FIG. 17, the all-in-one personal computer is configured to have a variety of functions so as to allow the personal computer to be used in a number of applications such as video entertainment, games, multimedia creation, art, graphics, communication and office use.

With a personal computer having an all-in-one configuration as described above, however, there are raised some problems that the configuration becomes complicated and that the cost is increased.

In addition, when the personal computer is connected to newly added AV equipment or a peripheral apparatus, it is necessary to install software or a program for controlling the newly added AV equipment in the personal computer by doing predetermined operations. Thus, the user must have the knowledge to install the software. As a result, there is also raised a problem that a user who does not have such knowledge will not be capable of controlling the newly installed peripheral apparatus from the personal computer.

Furthermore, even a user with the knowledge to install the software must carry out the predetermined operations. Particularly, in the case of a plurality of personal computers connected to a home bus, the predetermined installation operations have to be carried out for each of the personal computers, giving rise to a problem of cumbersome installation work.

On the top of that, even though it is possible to install numerous kinds of software in the personal computer in advance so as to allow the personal computer to be used for controlling a number of external peripheral apparatuses, when the system comprising the personal computer and the peripheral apparatuses is upgraded by sequentially adding new peripheral apparatuses one after another, the versions of the software installed in advance in the personal computer become obsolete, making it no longer possible to control the newly added peripheral apparatuses in some cases. In such a case, it is necessary to install software with most recent versions in the personal computer for the newly added peripheral apparatuses.

In addition, if the software is installed in the personal computer in advance, the maker of the peripheral apparatus is placed under restraint by specifications of the software, giving rise to a problem that it is difficult to build in the originality of the maker of the peripheral apparatus in the peripheral apparatus connected to the personal computer.

SUMMARY OF THE INVENTION

Addressing the problems described above, it is thus an object of the present invention to provide an electronic equipment control apparatus, an electronic equipment control method and an electronic equipment that require no operations to install software in the electronic equipment control apparatus and allow the manufacturer of peripheral equipment to display the originality thereof.

In order to achieve the object described above, the present invention provides some preferred embodiments implementing electronic equipment control apparatuses and electronic equipment control methods as well as electronic equipment described as follows.

According to one aspect of the present invention, there is provided an electronic equipment control apparatus for controlling one or more pieces of external electronic equipment connected to said electronic equipment control apparatus by communication lines, said electronic equipment control apparatus comprising; communication means for communication with said pieces of external electronic equipment through said communication lines; control means for controlling operations to request said pieces of external electronic equipment to transmit user interface information for controlling said pieces of external electronic equipment to said electronic equipment control apparatus; an storage means for storing said user interface information transmitted by said pieces of external electronic equipment through said communication lines.

In addition to the electronic equipment control apparatus described above, there is also provided an electronic equipment control method for controlling one or more pieces of external electronic equipment connected to an electronic equipment control apparatus by communication lines, said electronic equipment control method comprising: a requesting step of requesting said pieces of external electronic equipment to transmit user interface information for controlling said pieces of external electronic equipment to said electronic equipment control apparatus; a receiving step of receiving said user interface information transmitted by said pieces of external electronic equipment through said communication lines; and a storing step of storing said user interface information received from said external electronic equipment.

With the electronic equipment control apparatus and the electronic equipment control method provided by the present invention as described above, electronic equipment external to the electronic equipment control apparatus is requested to transmit user interface information required for controlling the equipment to the electronic equipment control apparatus. The user interface information transmitted in response to the request is then stored in the electronic equipment control apparatus. As a result, it is no longer necessary for the user to manually carry out operations to install the information in the electronic equipment control apparatus, enhancing the operability of the electronic equipment control apparatus. In addition, when new external electronic equipment is put to use, the electronic equipment control apparatus for controlling the electronic equipment is prevented from becoming obsolete only because the apparatus does not have the function for controlling the new electronic equipment.

According to another aspect of the present invention, there is provided an electronic equipment connected to an electronic equipment control apparatus by a communication line, said electronic equipment comprising: communication means for carrying out communication with said electronic equipment control apparatus through said communication line; storage means for storing user interface information used for controlling said electronic equipment; and control means which is used for transmitting said user interface information to said electronic equipment control apparatus when a request for transmission of said user interface information is received from said electronic equipment control apparatus.

In addition to the electronic equipment described above, there is also provided an electronic equipment control method for controlling electronic equipment connected to an electronic equipment control apparatus by a communication line, said electronic equipment control method comprising:

a request receiving step of receiving a request for transmission of user interface information required for controlling said electronic equipment from said electronic equipment control apparatus; and a control step of reading out said user interface information from a storage means and transmitting said user interface information to said electronic equipment control apparatus.

With the electronic equipment and the electronic equipment control method provided by the present as described above, in response to a request issued by the electronic equipment control apparatus, user interface information stored in advance in the electronic equipment is transmitted to the apparatus. As a result, the electronic equipment which can be controlled by the electronic equipment control apparatus can be implemented without the need to install the information in the apparatus, allowing the originality of the electronic equipment to be displayed with ease. Furthermore, electronic equipment with the most recent function can be implemented without being placed under restraint by the version of the software on the electronic equipment control apparatus.

According to a further aspect of the present invention, there is provided an electronic equipment control apparatus comprising a first piece of electronic equipment and a second piece of electronic equipment connected to said first piece of electronic equipment by a communication line and used for controlling said first piece of electronic equipment wherein: said first piece of electronic equipment comprises: first communication means for carrying out communication with said second piece of electronic equipment through said communication line; first storage means for storing user interface information required for controlling said first piece of electronic equipment; and first transmission means which is used for reading out said user interface information from said first storage means and transmitting said user interface information to said second piece of electronic equipment when a request for transmission of said user interface information is received from said second piece of electronic equipment, and said second piece of electronic equipment comprises: second communication means for carrying out communication with said first piece of electronic equipment through said communication line; control means for requesting said first piece of electronic equipment to transmit said user interface information required for controlling said first piece of electronic equipment to said second piece of electronic equipment to said second piece of electronic equipment; and second storage means for storing said user interface information transmitted by said first piece of electronic equipment through said communication line.

In addition to the electronic equipment control apparatus described above, there is also provided an electronic equipment control method for controlling an electronic equipment control apparatus comprising a first piece of electronic equipment and a second piece of electronic equipment connected to said first piece of electronic equipment by a communication line and used for controlling said first piece of electronic equipment wherein, in said first piece of electronic equipment, said electronic equipment control method comprises: a first communication step of carrying out communication with said second piece of electronic equipment through said communication line; a first storage step of storing user interface information required for controlling said first piece of electronic equipment; and a first transmission step at which said user interface information is read out from said first storage means and transmitted to said second piece of electronic equipment when a request for transmission of said user interface information is received from said second piece of electronic equipment, and in said second piece of electronic equipment, said electronic equipment control method comprises: a second communication step of carrying out communication with said first piece of electronic equipment through said communication line; a request step of requesting said first piece of electronic equipment to transmit said user interface information required for controlling said first piece of electronic equipment to said second piece of electronic equipment; and a second storage step of storing said user interface information transmitted by said first piece of electronic equipment through said communication line.

With the electronic equipment control apparatus and the electronic equipment control method provided by the present invention as described above, user interface information stored in advance in a first piece of electronic equipment can be transferred to a second piece of electronic equipment to be stored therein, allowing a system with an advance function in an application of interest to the user to be implemented at a low cost.

BRIEF DESCRIPTION OF THE DRAWINGS

Embodiments of the present invention will be described by referring to the following drawings wherein:

FIG. 17 is a diagram used for explaining functions of an all-in-one personal computer.

DETAILED DESCRIPTION OF THE PREFERRED EMBODIMENTS

Figure 1:
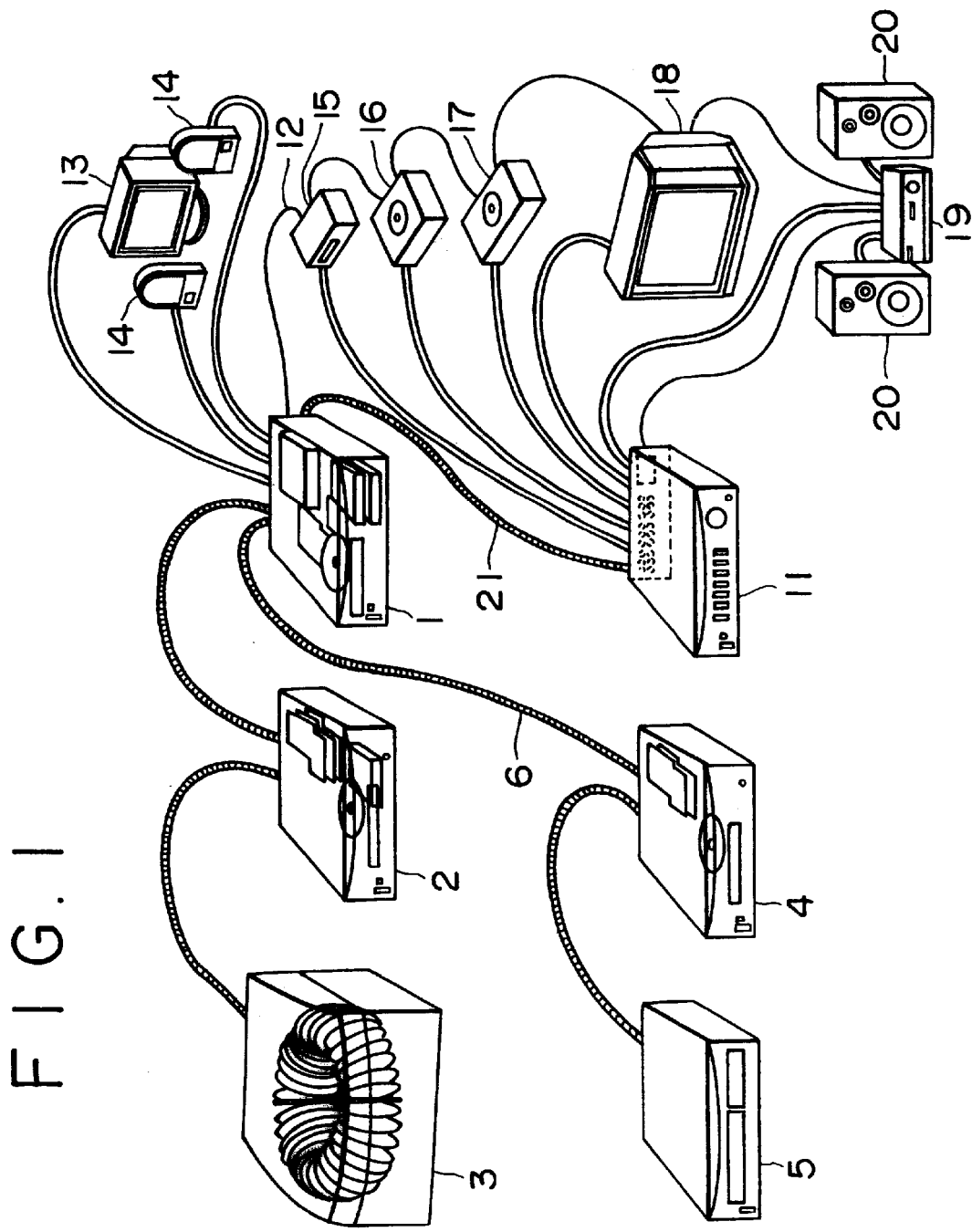
FIG. 1 is a diagram showing a typical configuration of an AV system to which the present invention is applied.

The present invention will become more apparent from the following detailed description of some preferred embodiments with reference to the accompanying diagrams. FIG. 1 is a diagram showing a typical configuration of an AV system to which the present invention is applied. As shown in the figure, the AV system comprises a PC (Personal Computer) module 1, an MPEG1 video deck module 2, a CD-ROM (Compact Disc Read Only Memory) changer module 3, a DVD-ROM (Digital Video Disc Read Only Memory)/movie player module 4 and a device-bay module 5 which are connected to each other by IEEE (Institute of Electrical and Electronics Engineers) 1394 cables 6 referred to hereafter simply as 1394 cables.

The PC module 1 is a personal computer which has only a relatively restricted number of basic functions. The MPEG1 video module 2 includes an encoder for generating an image signal conforming to MPEG (Moving Picture Experts Group) 1 specifications, a decoder for decoding such a signal and an embedded hard disc. In addition, the MPEG1 video module 2 is also provided with a drive unit for driving a video CD, allowing the MPEG1 video module 2 to be used independently as a video CD player.

The CD-ROM changer module 3 has 100 to 200 pieces of CD-ROM incorporated therein and an embedded drive unit for driving a CD-ROM selected from them. By mounting an ordinary CD, that is, an audio CD, on the CD-ROM changer player 3, the CD-ROM changer player 3 can be used independently as a CD player.

A detailed configuration of the DVD-ROM/movie player module 4 will be explained later by referring to FIG. 6. The DVD-ROM/movie player module 4 has an embedded drive unit for driving a mounted DVD-ROM in an operation to reproduce data recorded in the DVD-ROM. When used independently, the DVD-ROM/movie player module 4 functions as a DVD player.

The device-bay module 5 allows a new function to be added by mounting parts which are manufactured in accordance with specifications provided by manufacturers such as Intel (a trade mark) or Compaq (a trade mark).

The PC module 1 is connected to a monitor 13 and speakers 14 by signal lines 21. Pictures and sound generated by the PC module 1 are displayed and outputted by the monitor 13 and the speakers 14, respectively.

The PC module 1 is also connected to AV equipment not conforming to IEEE 1394 specifications such as a cassette tape deck 15, an MD (Mini Disc) deck 16, a video disc player 17, a television receiver 18, an amplifier 19 and an AV selector module 11. The PC module 1 is also capable of controlling these pieces of AV equipment through control lines 12. The AV selector module 11 is also connected to each of the cassette tape deck 15, the MD deck 16, the video disc player 17, the television receiver 18 and the amplifier 19 by a signal line 21. The AV selector module 11 is capable of selecting one of video or audio signals supplied by the pieces of AV equipment connected thereto and outputting the selected signal to one of the pieces of AV equipment. The amplifier 19 is connected to speakers 20 by a signal line 21.

It should be noted that, here, the cassette tape deck 15 is an apparatus having a tape driving unit and a signal processing unit for recording and playing back a signal to/from a music cassette tape.

By the same token, the MD deck 16 is an apparatus having a disk driving unit and an audio signal processing unit for playing back and recording an audio signal from and to an MD (mini disc).

Figure 2:
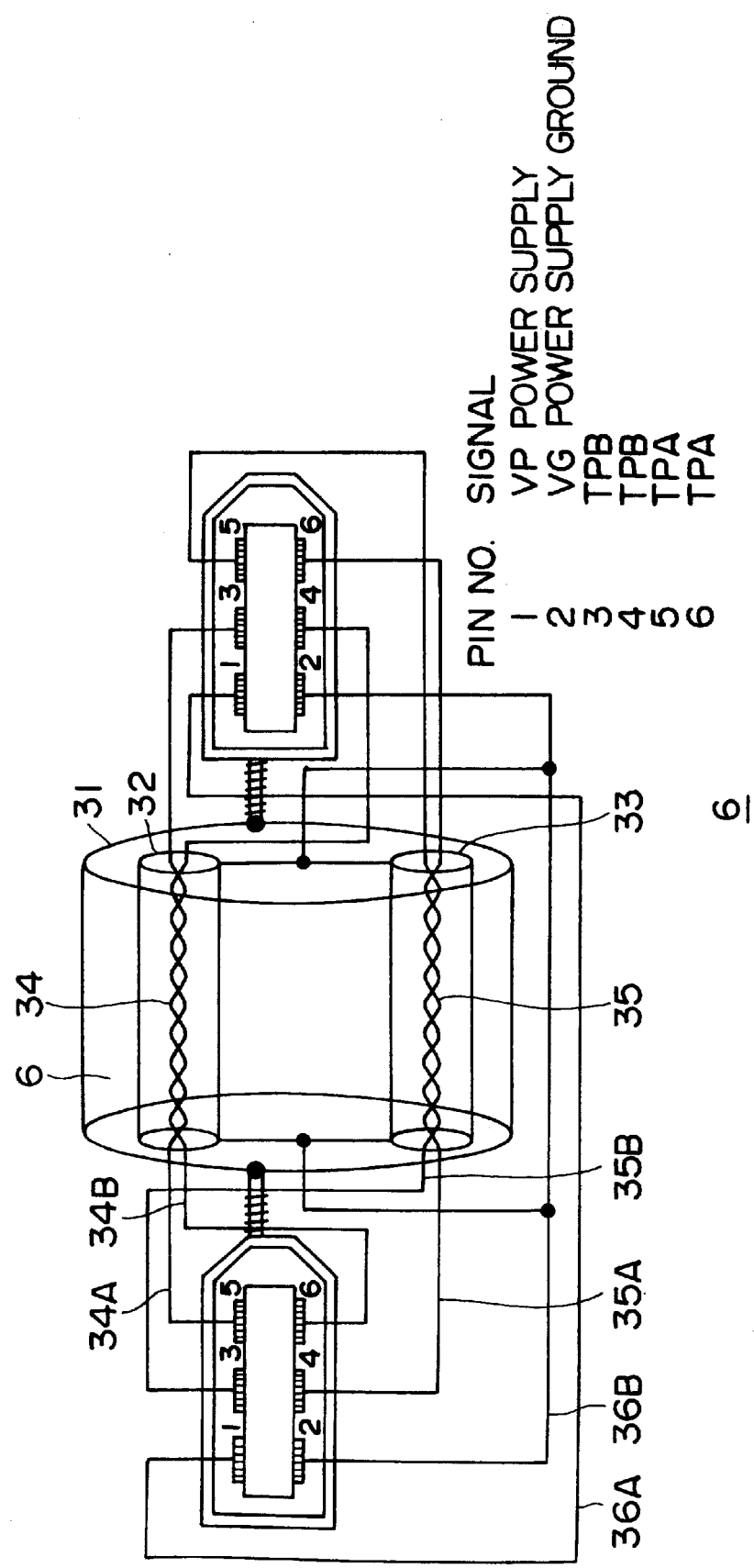
FIG. 2 is a diagram showing the configuration of a 1394 cable used in the AV system shown in FIG. 1.

FIG. 2 is a diagram showing a detailed configuration of the 1394 cable 6. As shown in the figure, the 1394 cable 6 has an outer cylindrical portion 31 and inner cylindrical portions 32 and 33 inside the outer cylindrical portion 31. Inside the inner cylindrical portion 32, a twisted line 34 comprising wires 34A and 34B is provided. By the same token, inside the inner cylindrical portion 33, a twisted line 35 comprising wires 35A and 35B is provided. The twisted lines 34 and 35 form signal paths which are independent of each other. In addition, lines 36A and 36B are provided outside the outer cylindrical portion 31 for supplying power.

The PC module 1 exchanges control, video and audio signals with the AV equipment having functions conforming to IEEE 1394 specifications such as the MPEG1 video deck module 2, the CD-ROM changer module 3, the DVD-ROM/movie player module 4 and the device-bay module 5 through the 1394 cables 6.

Figure 3:
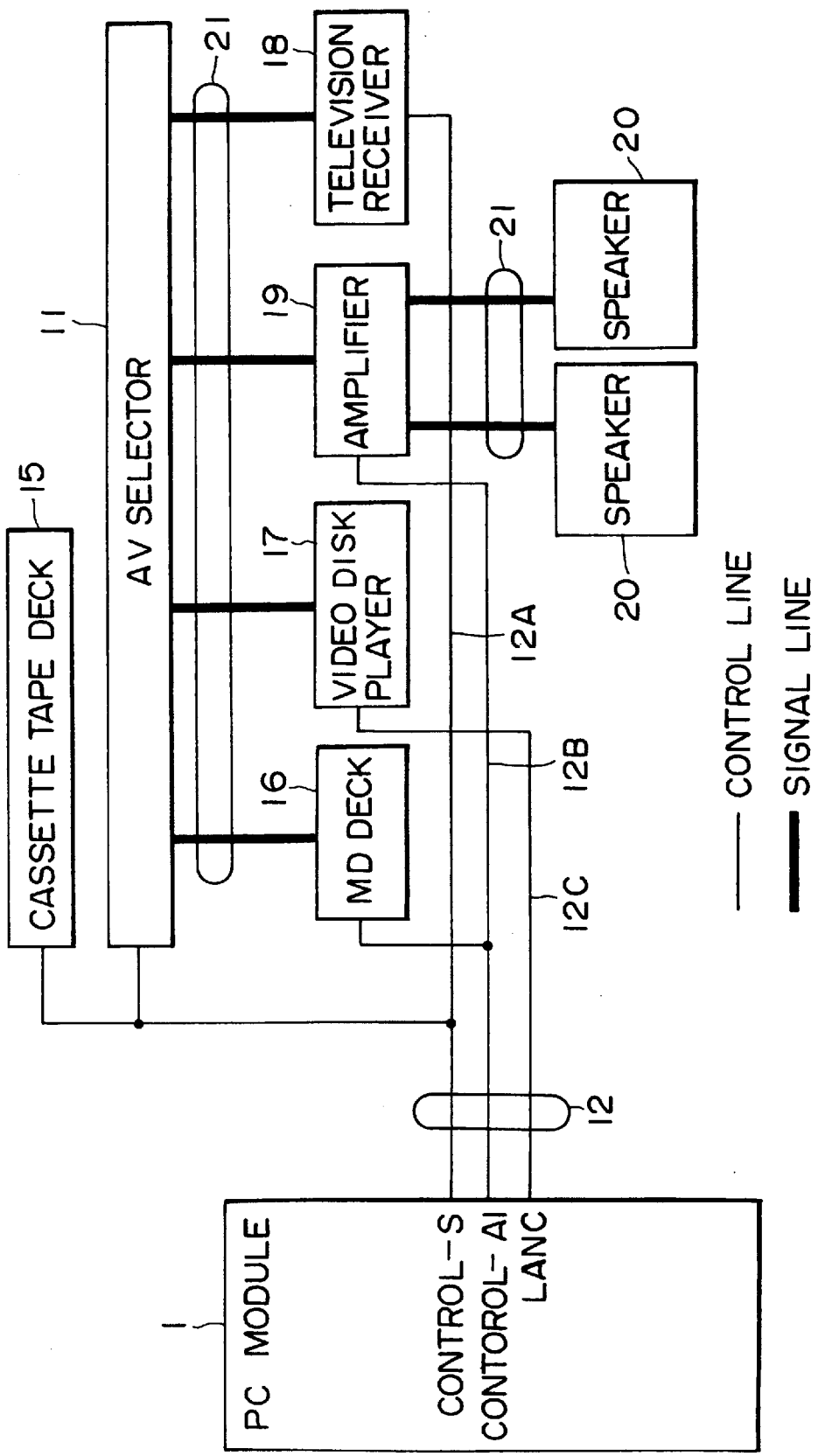
FIG. 3 is a diagram showing more detailed interconnection of control lines employed in the AV system shown in FIG. 1.

FIG. 3 is a diagram showing more detailed interconnection of the control lines 12 and the signal lines 21. The PC module 1 is capable of controlling the AV equipment in accordance with three kinds of specifications, i. e., Control S, Control A1 and LANC (Local Application Control Bus System). The control lines 12 comprise control lines 12A, 12B and 12C conforming to the Control S, Control A1 and LANC specifications, respectively. The control lines 12A, 12B and 12C are connected to pieces of AV equipment which conform to their respective specifications. In the case of this embodiment, the cassette tape deck 15, the AV selector 11, and the television receiver 18 each have a control function based on the Control S specifications. Thus, the cassette tape deck 15, the AV selector 11, and the television receiver 18 are connected to the PC module 1 by the control line 12A. On the other hand, the MD deck 16 and the amplifier 19 each have a control function based on the Control A1 specifications. Thus, the MD deck 16 and the amplifier 19 are connected to the PC module 1 by the control line 12B. Finally, the video disc player 17 has a control function based on the LANC specifications. Thus, the video disc player 17 is connected to the PC module 1 by the control line 12C.

It should be noted that, if the pieces of AV equipment shown in the figure all have a control function based on the same specifications, the control line 12 can be implemented by only one kind of control line.

Figure 4:
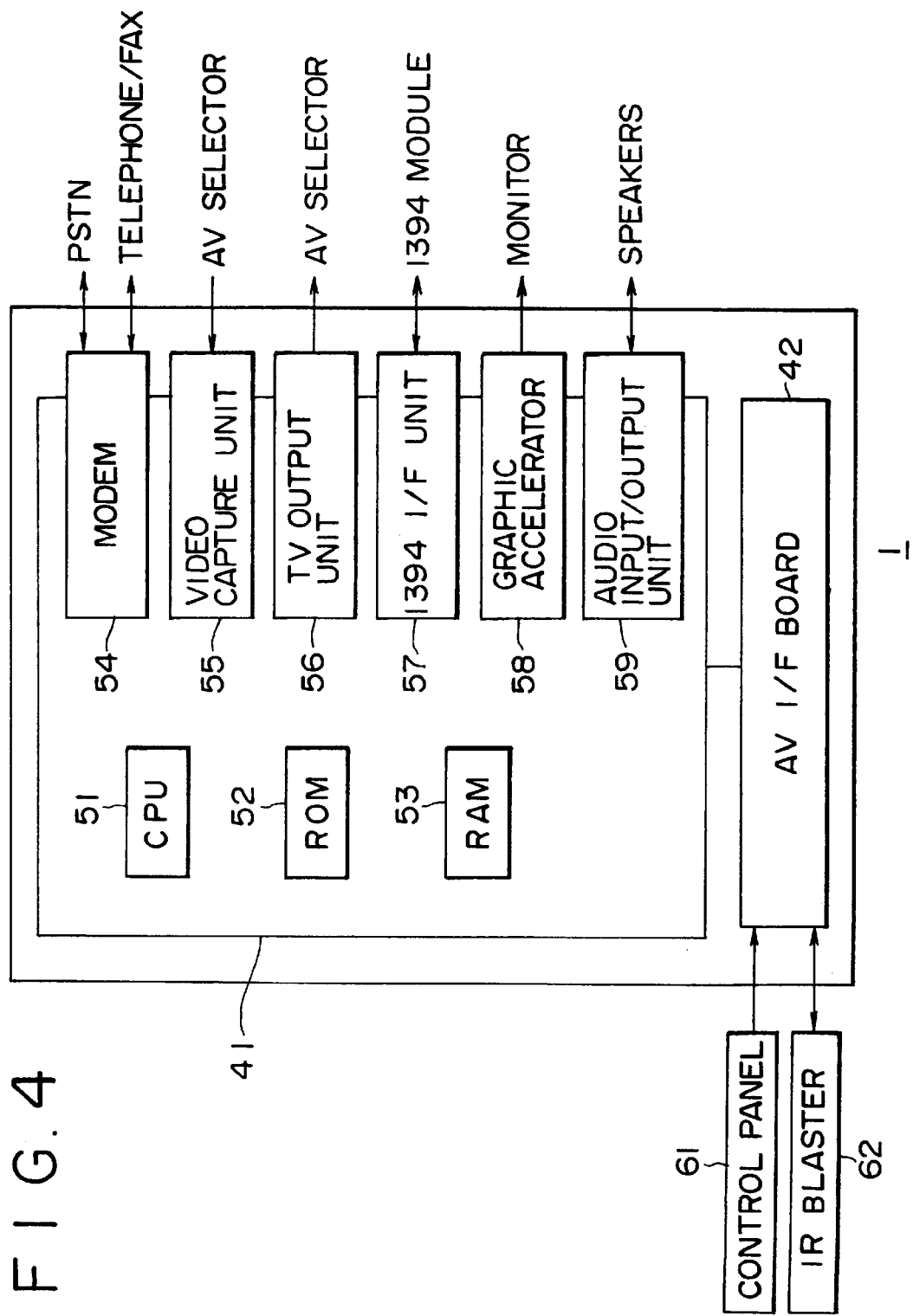
FIG. 4 is a block diagram showing a typical internal configuration of a PC module employed in the AV system shown in FIG. 1.

FIG. 4 is a diagram showing a typical internal configuration of the PC module 1. As shown in the figure, the PC module 1 comprises a mother board 41 and an AV interface (I/F) board 42. On the mother board 41, a variety of components for implementing a function as a personal computer are mounted. The components include a CPU 51 for executing various kinds of processing, a ROM (Read Only Memory) unit 52 for storing constants and programs required by the CPU 51 in the execution of the processing and a RAM (Random Access Memory) unit 53 for storing data required by the CPU 51 in the execution of the processing. The mother board 41 is either directly connected to a public telephone line of the PSTN (Public Switched Telephone Network) or provided with a modem 54 which is connected to equipment such as a telephone or a facsimile machine not shown in the figure. The modem 54 is used for carrying out communication through the telephone line. A video capture unit 55 receives a video signal supplied by the AV selector module 11 and carries out capturing processing on the video signal. A TV output unit 56 outputs a video signal from the mother board 41 to the AV selector module 11. For this reasons, the video capture unit 55 and the TV output unit 56 are each connected to the AV selector module 11 by a signal line 21.

A 1394 interface (I/F) 57 for processing data exchanged through the 1394 cable 6 is connected to the other AV equipment, that is, the MPEG1 video deck module 2 and the DVD-ROM/movie player module 4 in the case of this embodiment, by the 1394 cable 6. A graphic accelerator 58 generates graphical data, outputting it to the monitor 13 in order to display the data thereon. An audio input/output unit 59 outputs an audio signal generated by the mother board 41 to the speakers 14.

The AV interface board 42 is connected to a control panel 61 and an IR (Infrared) blaster 62. The AV interface board 42 controls the mother board 41 in accordance with a signal received from the control panel 61 or the IR blaster 62.

Figure 5:
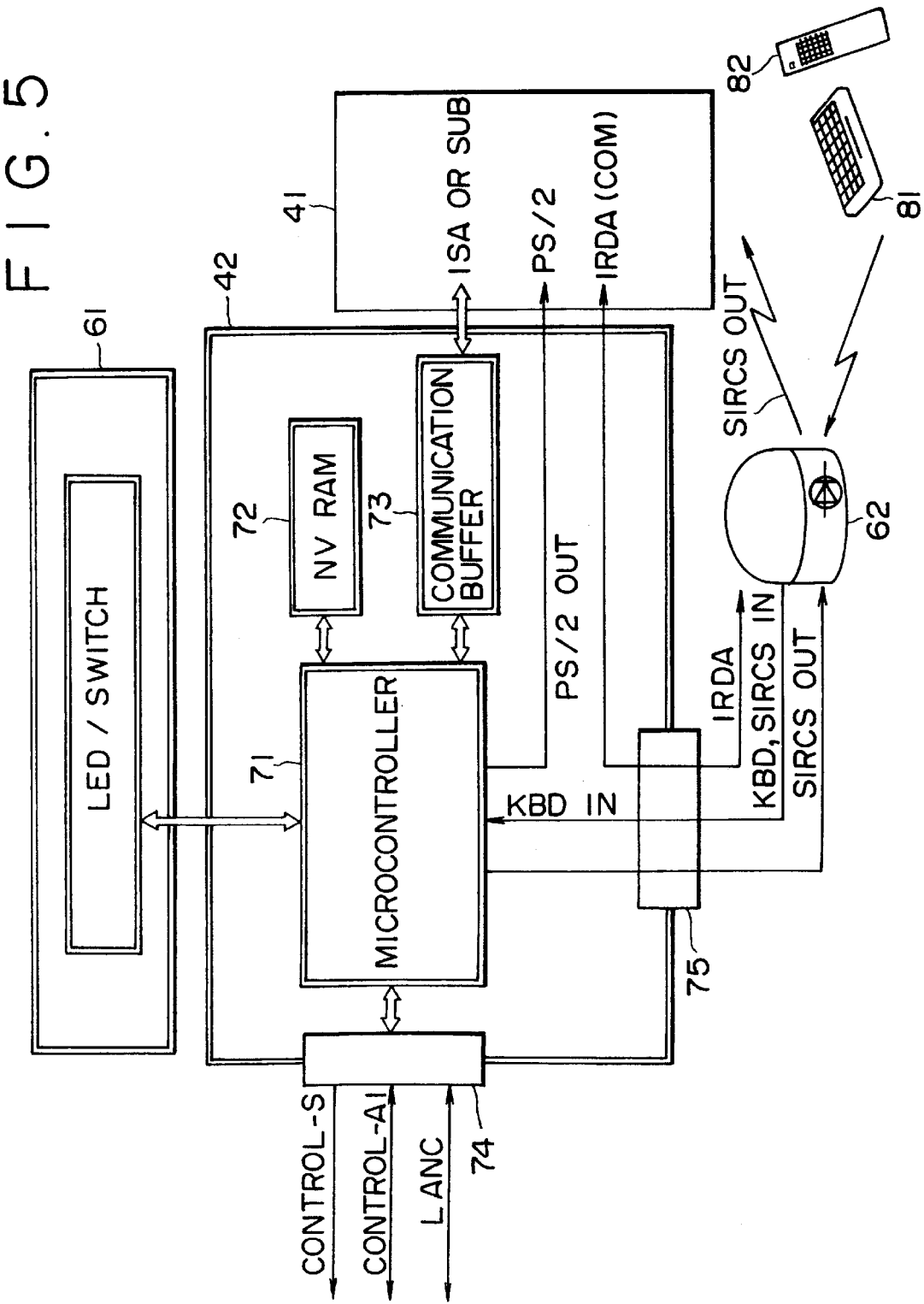
FIG. 5 is a diagram showing a typical configuration of an AV interface board employed in the PC module shown in FIG. 4.

FIG. 5 is a diagram showing a detailed configuration of the AV interface board 42. As shown in the figure, the AV interface board 42 includes a microcontroller 71 for executing various kinds of processing in accordance with signals received from a variety of switches provided on the control panel 61. In addition, the microcontroller 71 also controls operations to turn on and off LEDs provided on the control panel 61. An NVRAM (Non-volatile Random Access Memory) unit 72 is used for storing, among other information, data which is also required by the microcontroller 71 even after the power supply is turned off. A communication buffer 73 is connected to an ISA (Industry Standard Architecture) used as an extension slot of the mother board 41 or a USB (Universal Serial Bus), a kind of serial bus. The communication buffer 73 is located between the microcontroller 71 and the mother board 41. The microcontroller 71 outputs signals conforming to PS/2 (Personal System 2, a trade mark) specifications. In general, the PS/2 specifications are specifications used as an interface for connecting components such as a mouse and a keyboard of a computer to the computer.

The IR blaster 62 receives an infrared light signal output from an infrared light keyboard (or a radio keyboard) 81 or a remote commander 82, converting the infrared light signal into an electrical signal which is then supplied to the microcontroller 71 by way of a terminal 75 as a KBD signal or an SIRCS (Standard Code for Infrared Remote Control Systems, a trade mark) signal. The KBD signal is a signal representing a key code received from the infrared light keyboard 81. The microcontroller 71 converts the KBD signal received from the infrared light keyboard 81 to represent a key code into a PS/2 signal described above, transferring the PS/2 signal to the mother board 41. In this manner, the mother board 41 is capable of recognizing the signal received from the infrared light keyboard 81 in the same manner as a signal received from an ordinary keyboard connected by a wire. Generated by the remote commander 82, the SIRCS signal is a command signal for controlling the AV equipment. The microcontroller 71 converts the SIRCS signal received from the remote commander 82 into a control signal, that is, a Control-S, Control-A1 or LANC control signal, for controlling the AV equipment, transferring the control signal to the respective AV equipment through the control line 12. In this manner, the microcontroller 71 is capable of controlling the AV equipment connected to the control line 12 in accordance with the control line received from the remote commander 82 for the AV equipment. The IR blaster 62 receives a control signal conforming to SIRCS specifications from the microcontroller 71 by way of the terminal 75, converting the control signal into an infrared light signal which is used for controlling AV equipment. The AV interface board 42 is located between the mother board 41 and the IR blaster 62, facilitating exchanges of signals conforming to IrDA (Infrared Data Association) specifications between the mother board 41 and the IR blaster 62. The mother board 41 transmits data to apparatuses such as another personal computer and AV equipment by using an IrDA signal, a kind of infrared light signal, by way of the IR blaster 62.

Control signals conforming to the Control-S, Control-A1 and LANC specifications are inputted and outputted from and to the AV interface board 42 through the terminal 74. For this reason, the control lines 12A, 12B and 12C shown in FIG. 3 are connected to the terminal 74.

Figure 6:
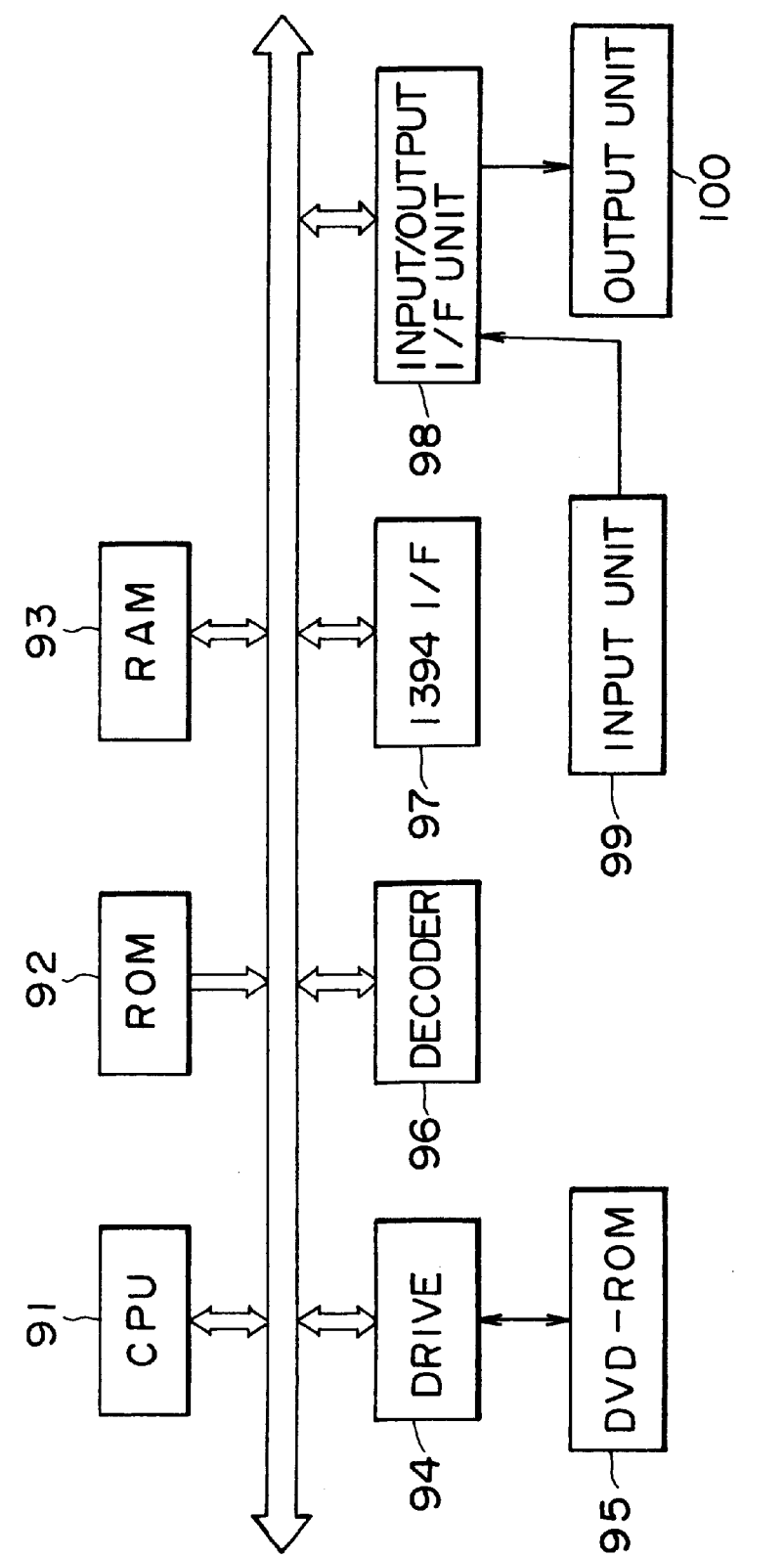
FIG. 6 is a block diagram showing a typical internal configuration of a DVD-ROM/movie player module employed in the AV system shown in FIG. 1.

FIG. 6 is a diagram showing a typical internal configuration of the DVD-ROM/movie player module 4. A CPU 91 executes various kinds of processing in accordance with programs stored in a ROM unit 92. A RAM unit 93 is used for properly storing, among other information, data required in the execution of the various kinds of processing by the CPU 91. A drive unit 94 drives a DVD-ROM 95. A decoder 96 executes processing to decode data reproduced from the DVD-ROM 95. A 1394 interface unit 97 executes processing to exchange data with the 1394 cable 6. An input/output interface unit 98 is connected to an input unit 99 and an output unit 100. A signal representing an input from the input unit 99 is passed on by the input/output interface unit 98 to the CPU 91 while data output by the CPU 91 is forwarded by the input/output interface unit 98 to the output unit 100. In this embodiment, the input/output interface unit 98 is an interface conforming to the IEEE 1394 specifications. The DVD-ROM/movie player module 4 is connected to the 1394 serial bus through the input unit 99 and the output unit 100. That is to say, the input unit 99 and the output unit 100 are each connected to the 1394 cable 6

Figure 7:
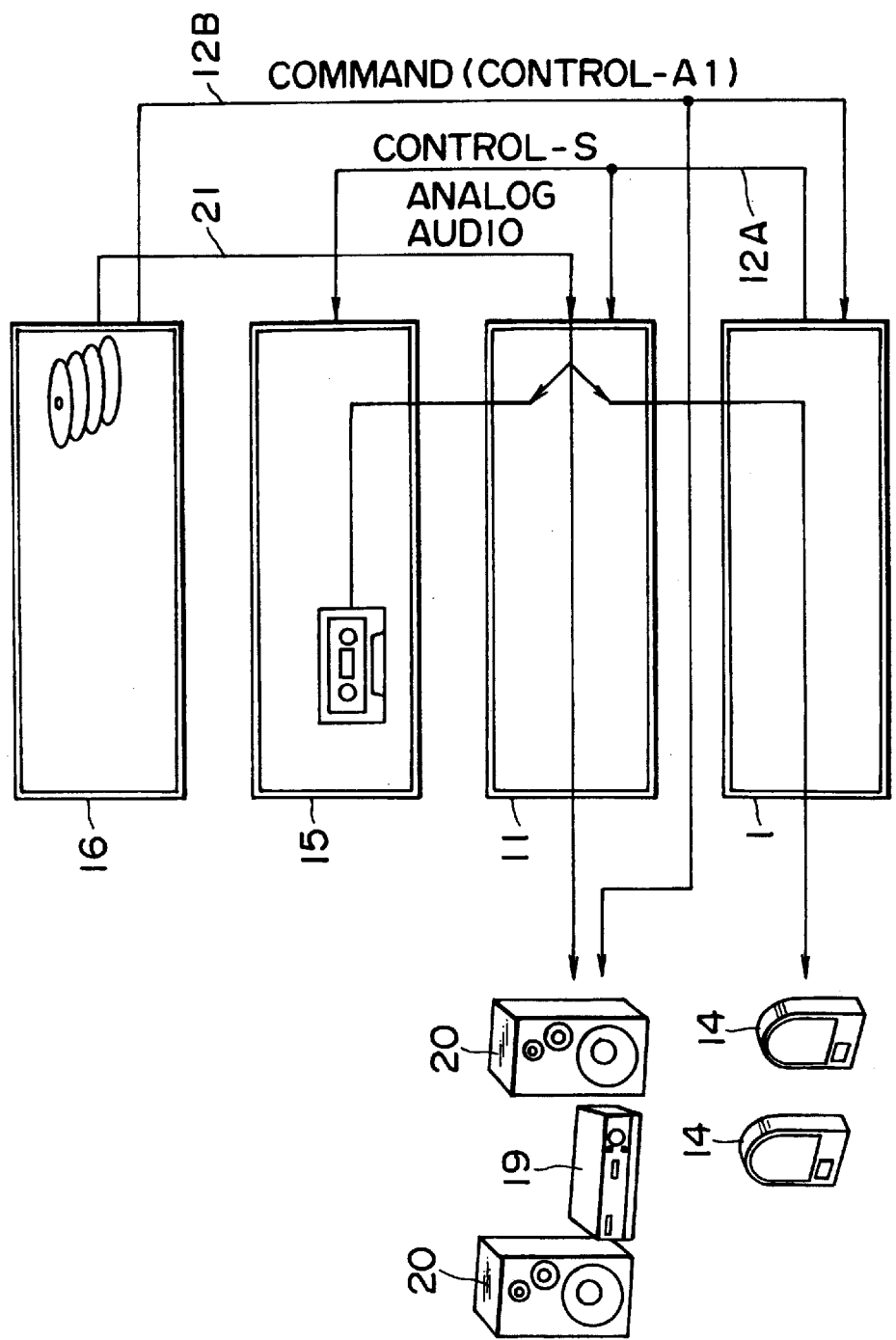
FIG. 7 is a diagram used for explaining operations to record a signal reproduced from an MD deck into a cassette tape deck employed in the AV system shown in FIG. 1.
Figure 8:
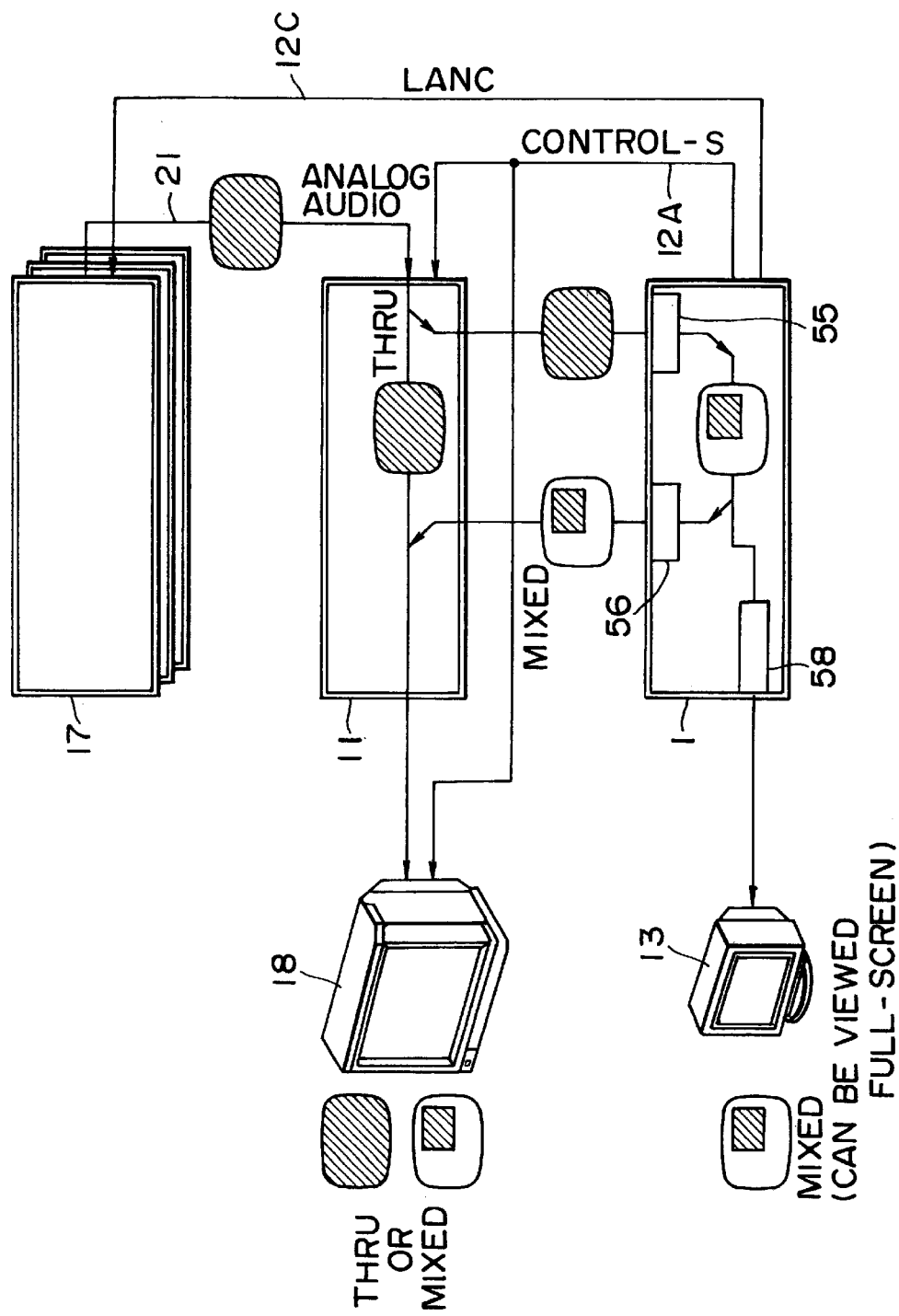
FIG. 8 is a diagram used for explaining operations to monitor a signal reproduced from a video disc player employed in the AV system shown in FIG. 1.

The PC module 1 controls AV equipment not conforming to the 1394 specifications through the control line 12. FIGS. 7 and 8 are each a diagram showing an example of this control.

In the example shown in FIG. 7, control to carry out dubbing of a signal reproduced from the MD deck 16 and recorded to the cassette deck 15 and, at the same time, to output sound played back from the MD deck 16 to the speakers 20 is executed. First of all, the PC module 1 outputs a command conforming to the Control A1 specifications to the MD deck 16 through a control line 12B, requesting that a signal be played back from an MD mounted on the MD deck 16. Receiving the command, the MD deck 16 reproduces an analog audio signal from the MD mounted thereon, outputting the signal to the AV selector module 11 through a signal line 21.

Then, the PC module 1 outputs a command conforming to the Control-S specifications to the AV selector module 11 through a control line 12A, requesting the AV selector module 11 that the playback signal received from the MD deck 16 be passed on to the amplifier 19, the cassette tape 15 and the PC module 1 itself. The PC module 1 further outputs a command conforming to the Control A1 specifications to the amplifier 19 through a control line 12B, requesting the amplifier 19 that the playback signal passed on thereto by the AV selector module 11 from the MD deck 16 be amplified and the amplified signal be outputted to the speakers 20.

Then, PC module 1 also outputs a command conforming to the Control S specifications to the cassette tape deck 15 through a control line 12A, requesting the cassette tape deck 15 that the playback signal passed on thereto by the AV selector module 11 from the MD deck 16 be recorded into a cassette tape mounted on the cassette tape deck 15. In addition, the PC module 1 also outputs the playback signal passed on thereto by the AV selector module 11 from the MD deck 16 to the speakers 14 by way of the audio input/output unit 59 employed in the PC module 1.

In the example shown in FIG. 8, on the other hand, control to display a video signal reproduced by the video disc player 17 on the television receiver 18 and to display images created in the PC module 1 on the monitor 13 is carried out.

First, the PC module 1 outputs a command conforming to the LANC specifications to the video disc player 17 through a control line 12C, requesting the video disc player 17 that a video signal be reproduced from a video disc mounted thereon. The playback signal is then outputted by the video disc player 17 to the AV selector module through a signal line 21.

Then, the PC module 1 outputs a command conforming to the Control S specifications to the AV selector module 11 through the control line 12A, requesting the AV selector module 11 that the playback video signal received from the video disc player 17 be passed on to the television receiver 18. At the same time, the PC module 1 outputs a command conforming to the Control S specifications to the television receiver 18 through the control line 12A, controlling the television receiver 18 to display a picture conveyed by the playback video signal passed on thereto by the AV selector module 11 from the video disc player 17.

In addition, the PC module 1 controls the AV selector module 11 through the control line 12A, requesting the AV selector module 11 that the playback video signal received from the video disc player 17 also be passed on to the PC module 1 itself. In the PC module 1, the playback video signal is put in the video picture unit 55 employed therein and, if necessary, mixed with a predetermined image in the graphic accelerator 58 before being outputted to the AV selector module 11 by way of the TV output unit 56. The PC module 1 is also capable of having the mixed signal displayed on the television receiver 18. In this case, the PC module 1 controls the AV selector module 11 through the control line 12A, requesting the AV selector module 11 that the mixed video signal transmitted by the PC module 1 be selected in place of the playback video signal generated by the video disc player 17 and be displayed on the television receiver 18.

The PC module 1 is also capable of displaying the mixed video signal on the monitor 13. In this case, the mixed video signal is outputted to the monitor 13 from the graphic accelerator 58.

The following is description of operations carried out by the PC module 1 to control pieces of AV equipment connected to the PC module 1 by 1394 cables 6. When the power supply is turned on, the PC module 1 carries out initialization processing represented by a flowchart shown in FIG. 9.

As shown in the figure, the flowchart begins with a step S1 where the CPU 51 employed in the PC module 1 requests AV equipment connected to the PC module 1 by a 1394 cable 6, for example, the DVD-ROM/movie player module 4, that icon picture information of the DVD-ROM/movie player module 4 be transmitted to the PC module 1. The DVD-ROM/movie player module 4 has its icon picture data stored in the ROM unit 92 employed therein. The icon picture data is a picture data for an icon 114 like the ones shown in FIG. 10. Receiving the request made by the PC module 1 through the 1394 cable 6, the CPU 91 employed in the DVD-ROM/movie player module 4 executes processing of step S11 of a flowchart shown in FIG. 11 to read out the icon picture data stored in the ROM unit 92 and to output the data to the 1394 cable 6 by way of the 1394 interface unit 97.

Figure 9:
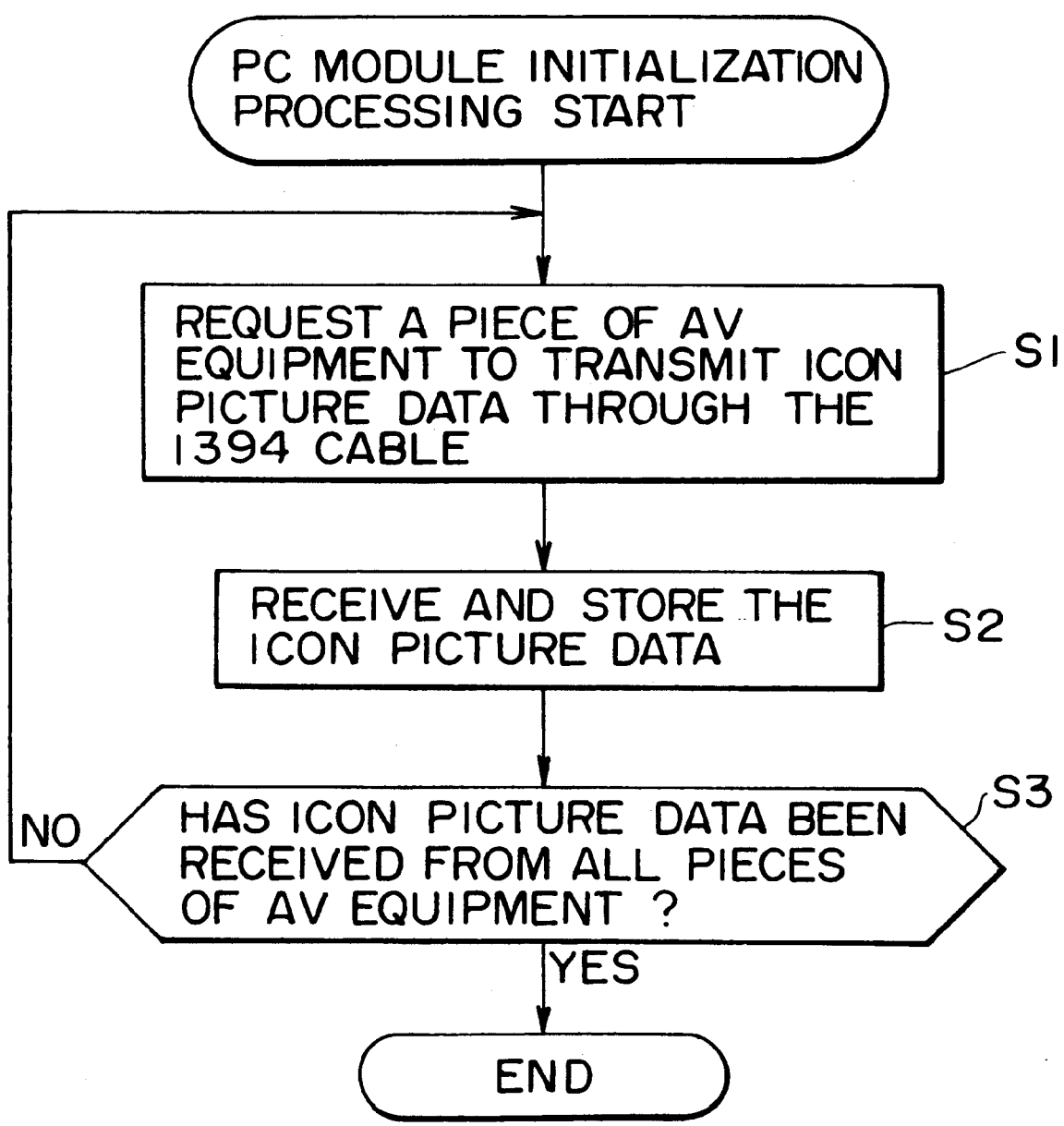
FIG. 9 is a flowchart used for explaining operations carried out during initialization by the PC module employed in the AV system shown in FIG. 1.

At step S2 of the flowchart shown in FIG. 9, the icon picture data is put in the 1394 interface unit 57 before being supplied to the CPU 51. The CPU 51 receives the incoming icon picture data and stores it in the RAM unit 53.

The flow of processing then goes on to step S3 where the CPU 51 forms a judgment as to whether or not icon picture data has been received from all pieces of AV equipment connected to the PC module 1 by 1394 cables 6. If there is a piece of AV equipment from which the icon picture data thereof has not been received, the flow of processing returns to the step S1 to execute the same processing.

Figure 10:
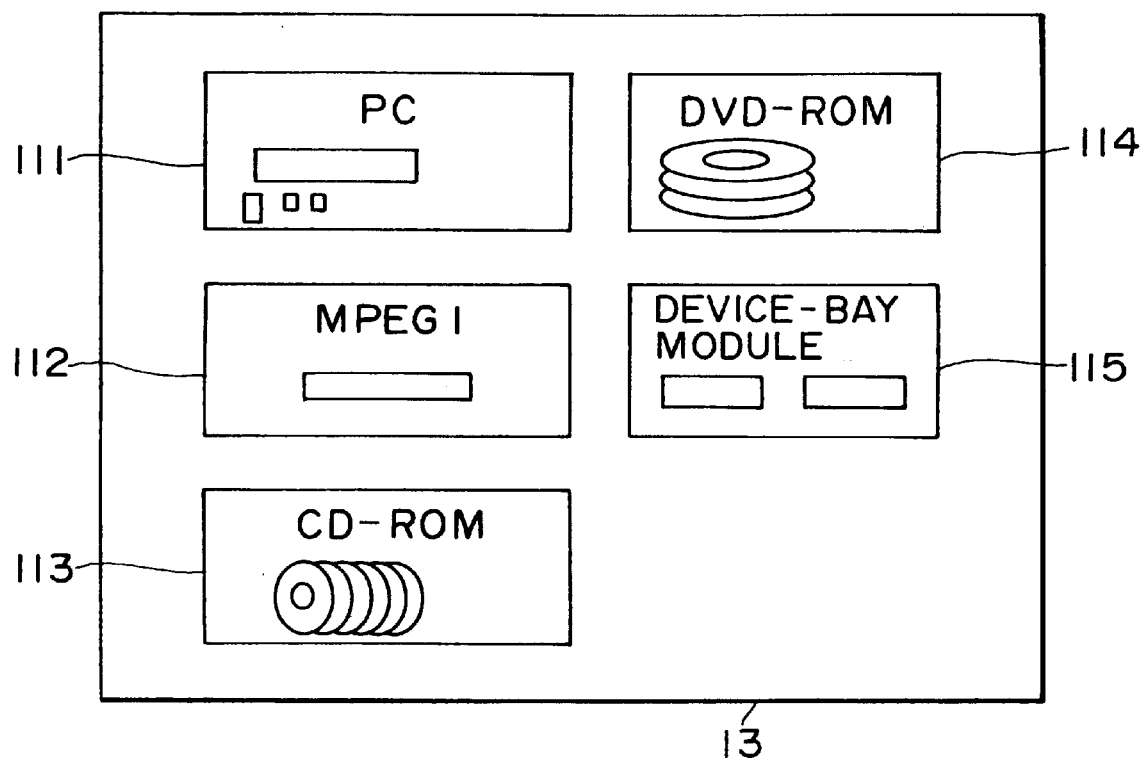
FIG. 10 is a diagram showing an example of displaying icon pictures of AV equipment.
Figure 11:
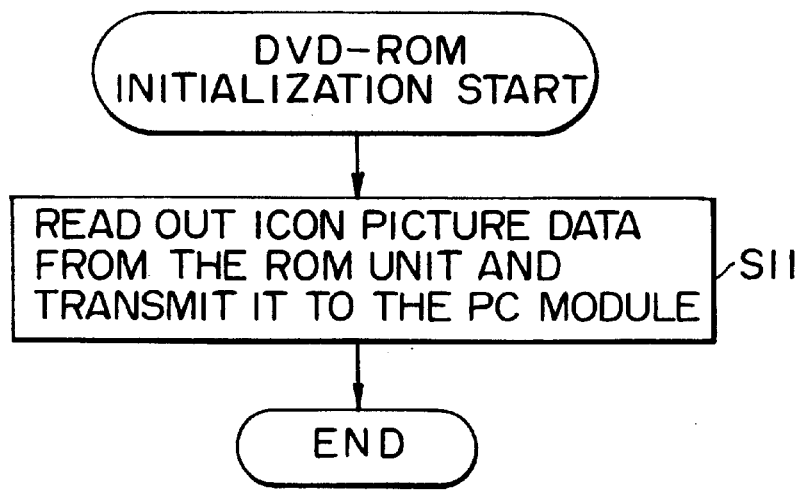
FIG. 11 is a flowchart used for explaining initialization processing of the DVD-ROM/movie player.

By the same token, the PC module 1 also receives pieces of icon picture data 112, 113 and 115 shown in FIG. 10 from the MPEG1 video deck module 2, the CD-ROM changer module 3 and the device-bay module 5, respectively, storing the icon picture data in the RAM module 53.

On the other hand, if the outcome of the judgment formed at the step S3 indicates that icon picture data has been received from all pieces of AV equipment connected to the PC module 1 by 1394 cables 6, the initialization processing is ended.

It should be noted that, while the PC module 1 carries out the initialization processing when the power supply of the PC module 1 is turned on in the example described above, the timing with which the initialization processing is carried out is not necessarily the power-on time. For example, the CPU 51 employed in the PC module 1 may perform the initialization processing for the AV equipment on a bus connected by 1394 cables 6 to the PC module 1 for every predetermined period based on a program stored in the RAM unit 51 employed in the PC module 1.

In addition, in the case of the IEEE 1394 bus, a new piece of electronic equipment can be connected to the bus without turning off the power supply of pieces of electronic equipment already connected to the bus. In this case, the setting on the bus is reset and initialization processing of the bus (bus reset processing) is carried out. The PC module 1 may then execute the initialization processing represented by the flowchart shown in FIG. 9 after knowing that the bus reset processing has been done.

With such a scheme, the PC module 1 is capable of controlling pieces of AV equipment connected thereto without the need to again turn on the power supply of the PC module 1 for a piece of AV equipment which is newly connected to the 1394 serial bus after the power supply of the PC module 1 has been once turned on.

Figure 12:
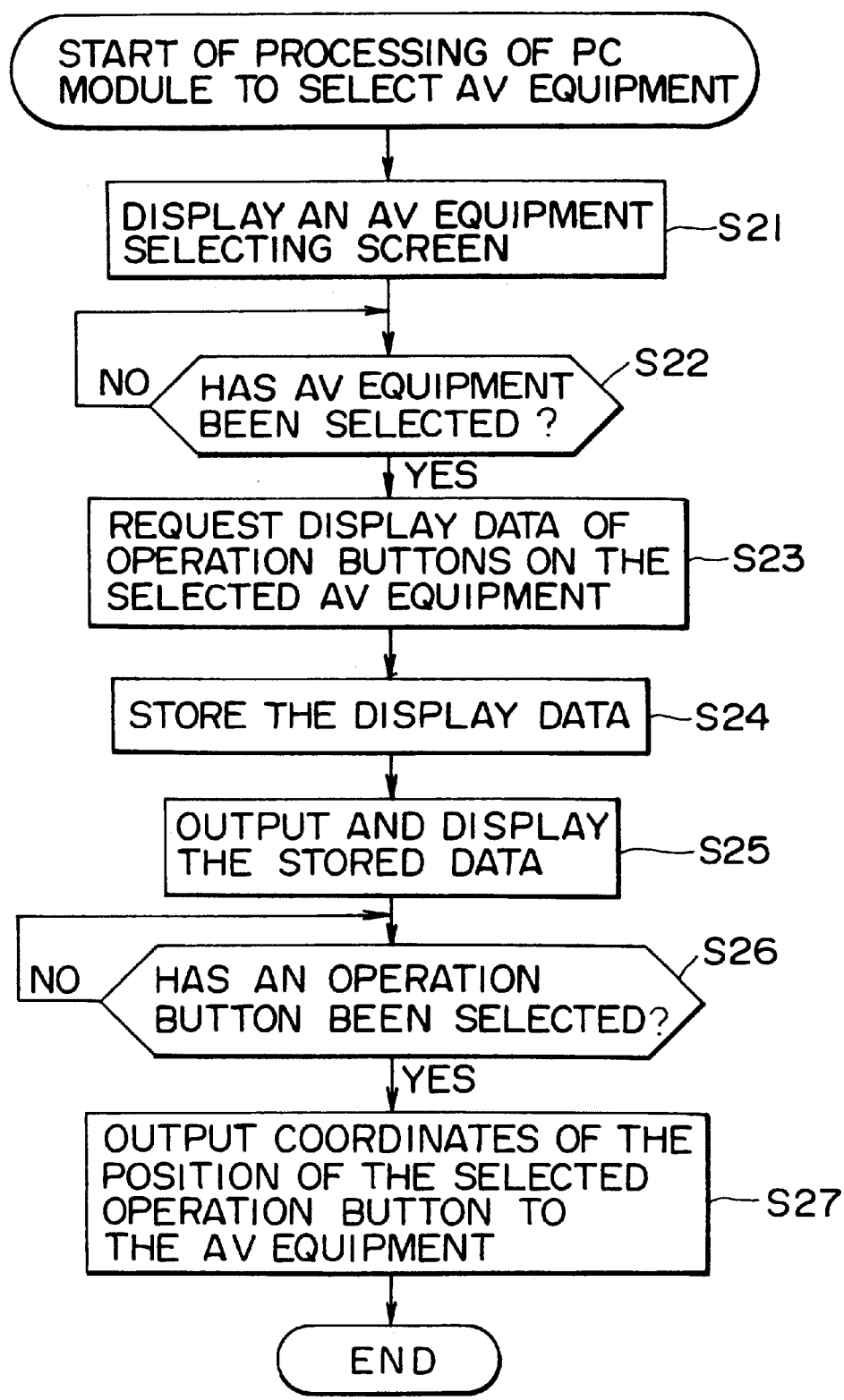
FIG. 12 is a flowchart used for explaining processing carried out by the PC module to select a piece of AV equipment.

The following is description of an example of processing to control operations of AV equipment connected to the PC module 1 by a 1394 cable 6 with reference to a flowchart shown in FIG. 12. As shown in the figure, the flowchart begins with step S21 at which the user operates, for example, a predetermined key of the infrared light keyboard 81, requesting that a selected screen of AV equipment be displayed. When the predetermined key of the infrared light keyboard 81 is operated, an infrared light signal corresponding to the operated key is outputted by the infrared light keyboard 81 to the IR blaster 62. The IR blaster 62 converts the infrared light signal into an electrical signal (a KBD signal), outputting the electrical signal to the microcontroller 71. Receiving the electrical signal which represents the operated key of the infrared light keyboard 81, the microcontroller 71 converts the electrical signal into a PS/2 signal which is then supplied to the CPU 51 employed in the mother board 41.

Receiving the PS/2 signal, the CPU 51 reads out icon picture data from the ROM unit 53 and outputs the data to the graphic accelerator 58. The graphic accelerator 58 converts the icon picture data supplied thereto into bit map data, outputting the bit map data to the monitor 13 to be displayed on a screen. In this manner, icon pictures 112 to 115 shown in FIG. 10 for example are displayed on the monitor 13 for some AV equipment connected by 1394 cables 6. In addition, at that time, the PC module 1 reads out its own icon picture data stored the ROM unit 52 in advance, displaying the data as an icon picture 111 as shown in FIG. 10.

The user specifies a piece of AV equipment to be used by selecting one of the pieces of icon picture data displayed on the screen as shown in FIG. 10. The piece of icon picture data for the desired piece of AV equipment is selected by moving a cursor to point to the piece of icon picture data by operation of a predetermined key on the infrared light keyboard 81. When the key is operated, a key signal is transmitted to the CPU 51 by way of the IR blaster 62 and the microcontroller 71. At step S22, the CPU 51 enters a state waiting for an icon picture to be selected by the user. As an icon picture is selected, the flow of processing goes on to step S23.

Figure 13:
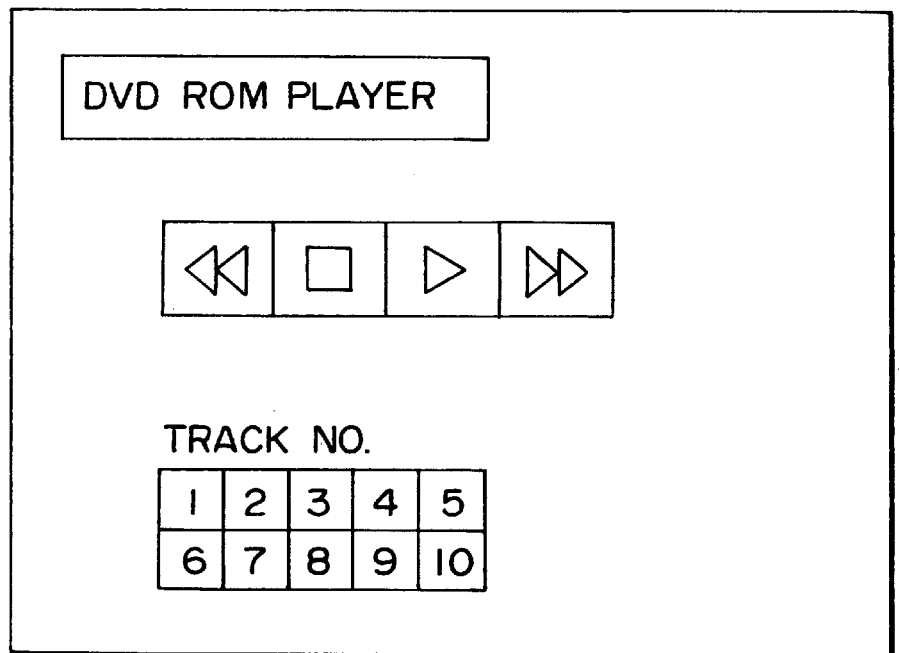
FIG. 13 is a diagram showing an example of displaying buttons for controlling the DVD-ROM/movie player module.

At step 23, the CPU 51 requests the selected AV equipment to transmit display data of operation buttons on the AV equipment to the CPU 51. The display data is user interface information required for controlling the AV equipment. To put it in detail, the CPU 51 issues a command requesting the transmission of the display data to the AV equipment by way of the 1394 interface unit 57 and the 1394 cable 6. For example, assume that an icon picture 114 of the DVD-ROM/movie player module 4 is selected. In this case, the CPU 51 requests the DVD-ROM/movie player module 4 to transmit display data of buttons on the DVD-ROM/movie player module 4 required for operations thereof. FIG. 13 is a diagram showing typical display data of the DVD-ROM/movie player module 4. As will be described by referring to FIG. 14, receiving the request made by the CPU 21, the DVD-ROM/movie player module 4 outputs the display data of its buttons required for controlling itself to the 1394 cable 6 as requested by the command at a step S31.

As shown in FIG. 13, the display data includes picture of buttons, information on the layout of the buttons, a text (strings of characters) explaining the functions of the buttons and a script (program). In addition, the display data can be described by using a HTML (Hypertext Markup Language) or JavaScript (a trade mark). Generally used in a network, the HTML is a language for describing a format of a document. Much like the HTML, JavaScript is a programming language generally used in a network. Normally, JavaScript is called from a point in a description written in the HTML and used for carrying out predetermined processing specified in a document.

At step S24, the CPU 51 employed in the PC module 1 receives, through the 1394 interface module 57, the display data transmitted by the DVD-ROM/movie player interface 4 via the 1394 cable 6 and stores the display data in the RAM unit 53. The flow of processing then goes on to step S25 at which the CPU 51 reads out the display data back from the RAM unit 53, outputting the data to the graphic accelerator 58. The graphic data is then converted by the graphic accelerator 58 into bit map data which is finally outputted to the monitor 13 to be displayed thereon.

In this manner, display data including information on buttons required for operating the DVD-ROM/movie player module 4 such as the one shown in FIG. 13, for example, is displayed on the monitor 13. In the example of the display data shown in FIG. 13, a string of characters 'DVD-ROM player' appears on the screen as the name of the DVD-ROM/movie player module 4. Beneath the string of characters, buttons to be operated to request rewind, stop, playback and fast feed operations are displayed. In addition, buttons to be operated to specify a track are displayed below the operations buttons.

The flow of processing then goes on to step S26 where the CPU 51 employed in the PC module 1 enters a state waiting for one of the buttons shown in FIG. 13 to be operated. The user then selects one of the buttons displayed on the monitor 13 by operating the infrared light keyboard 81. When the CPU 51 recognizes that one of the buttons is selected by the user at the step S26, the flow of processing proceeds to step S27 at which the CPU 51 detects the coordinates of the position of the selected button on the monitor 13, that is, information used for recognizing the selected button, and then outputs the positional coordinates to the DVD-ROM/movie player module 4 by way of the 1394 interface unit 57. As will be described later, upon receiving the positional coordinates, the DVD-ROM/movie player module 4 carries out processing corresponding to the button specified by the positional coordinates at step S33 of a flowchart shown in FIG. 14.

Figure 14:
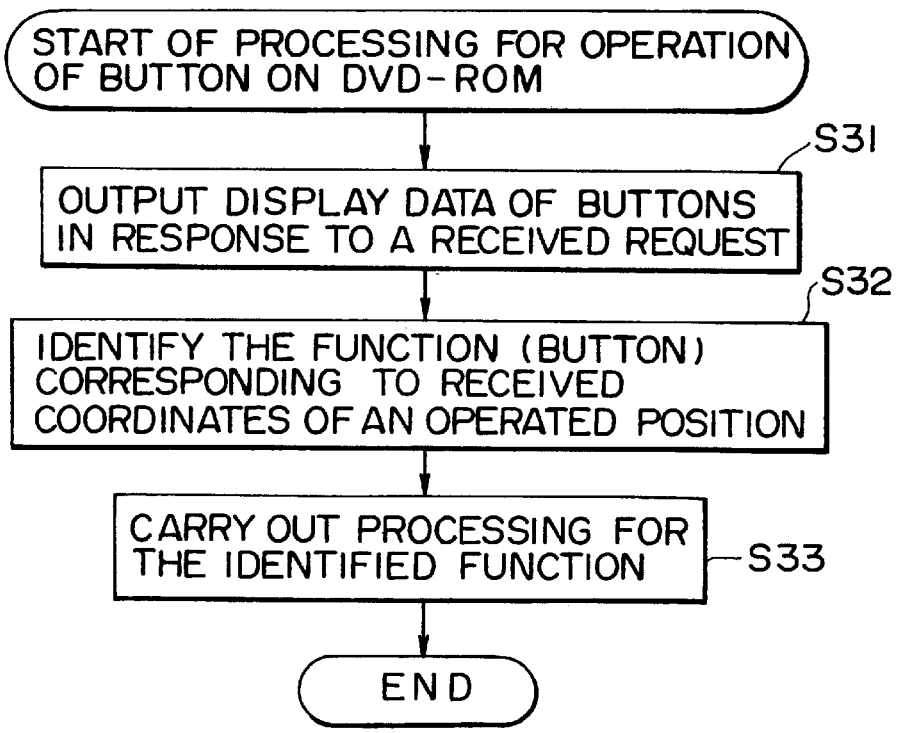
FIG. 14 is a flowchart used for explaining processing which is carried out when a button on the DVD-ROM/movie player module is operated.

Next, operations carried out by the DVD-ROM/movie player module 4 are explained by referring to the flowchart shown in FIG. 14. As shown in the figure, the flowchart begins with a step S31 where the CPU 91 employed in the DVD-ROM/movie player module 4 receives a command issued by the PC module 1 at step S23 of the flowchart shown in FIG. 12 through the 1394 interface unit 97. Receiving the command, the CPU 91 reads out display data of the buttons on the DVD-ROM/movie player module 4 stored in advance in the ROM unit 92 such as the one shown in FIG. 13 and outputs the display data to the PC module 1 by way of the 1394 interface unit 97. As described earlier, the PC module 1 receives the display data outputted by the DVD-ROM/movie player module 4 at step S24 of the flowchart shown in FIG. 12.

The PC module 1 then outputs coordinates of the position of an operated one of the buttons shown in FIG. 13 at the step S27 in case the user operates the button also as described earlier. When the CPU 91 employed in the DVD-ROM/movie player module 4 receives the coordinate data through the 1394 interface unit 97, at step S32 of the flowchart shown in FIG. 14, the CPU 91 forms a judgment as to which function the button specified by the received coordinates has. For example, the CPU 91 determines whether the button specified by the coordinates is the playback button, the fast feed button, or the rewind button. The flow of processing then goes on to step S33 where the CPU 91 carries out processing corresponding to the function identified at the step S32. For example, when the playback button was judged at step S32 to have been operated, the CPU 91 controls the drive unit 94 to reproduce a signal from the DVD-ROM 95 or, when the fast feed button was judged at step S32 to have been operated, the CPU 91 puts the CD-ROM 95 in a fast feed state.

Data reproduced from the DVD-ROM 95 is decoded by the decoder 96 before being outputted to the 1394 cable 6 by way of the 1394 interface unit 97. The PC module 1 receives the reproduced data transmitted by the DVD-ROM/movie player module 4 via the 1394 cable 6 through the 1394 interface unit 57, outputting the video data to the graphic accelerator 58 and the audio data to the audio input/output unit 59. The graphic accelerator 58 converts the video data supplied thereto into bit map data, outputting the bit map data to the monitor 13 to be displayed thereon. On the other hand, the audio input/output unit 59 passes on the audio data supplied thereto to the speakers 14 to be thereby outputted. In this manner, the user can enjoy pictures and sound played back from the DVD-ROM 95 by using the monitor 13 and the speakers 14, respectively.

Figure 15:
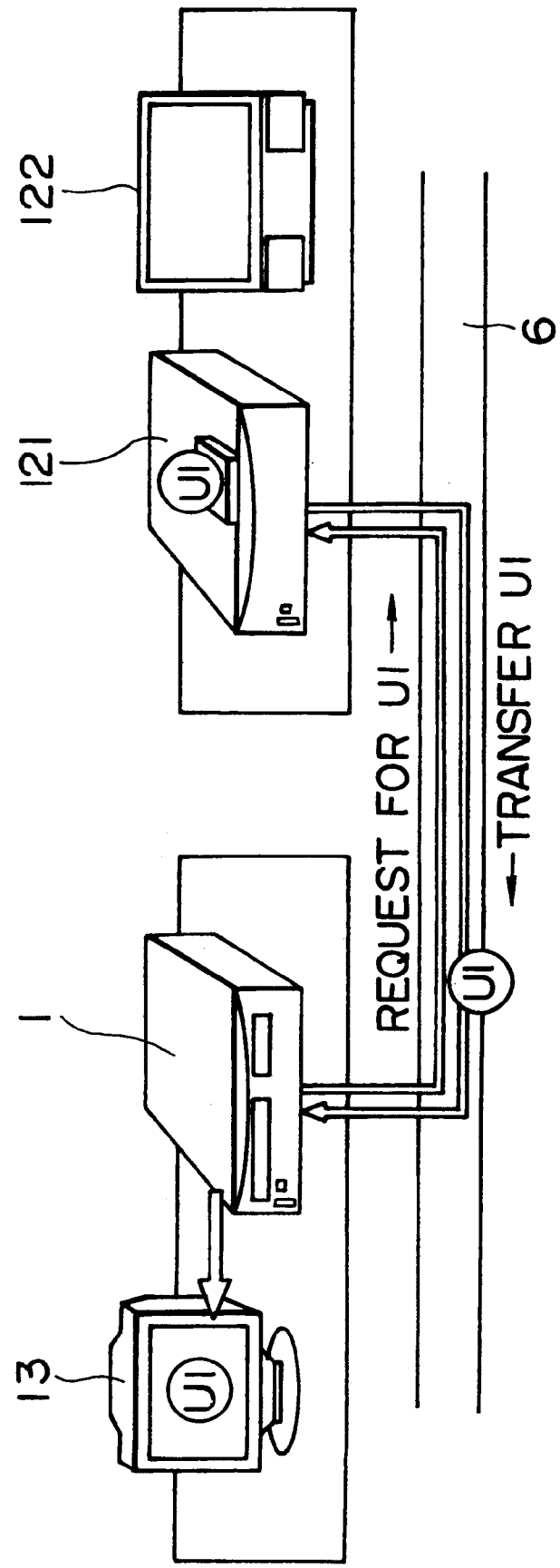
FIG. 15 is a diagram used for explaining transmission of user interface information.

FIG. 15 is a model diagram showing an operation to read in user interface information of AV equipment connected by a 1394 cable 6 to the PC module 1. As shown in the figure, in the present embodiment, the AV equipment 121 such as the MPEG1 video deck module 2, the CD-ROM changer module 3, the DVD-ROM/movie player module 4, or the device-bay module 5 shown in FIG. 1 can be used as a stand alone unit or in conjunction with AV equipment 122 independently, that is, without utilizing the PC module 1.

When the AV equipment is connected to the PC module 1 by a 1394 cable 6 to be controlled by the PC module 1, however, user interface information stored in advance in the AV equipment 121 is transferred to the PC module 1 to be stored therein through the 1394 cable 6. In other words, user interface information of other AV equipment is not stored in the PC module 1 initially. When the AV equipment 121 is connected to the PC module 1 by the 1394 cable 6, user interface information (UI) stored in the AV equipment 121 is transferred to the PC module 1 automatically, that is, without special operations which need to be carried out by the user.

As a result, when the user purchases the AV equipment 121, it is not necessary for the user to install the user interface information, that is, software for controlling the AV equipment 121 from the PC module 1, in the PC module 1. The user needs only to connect the AV equipment 121 to the PC module 1 by a 1394 cable 6 and, by merely turning on the power supply, the software installation processing is carried out automatically.

Figure 16:
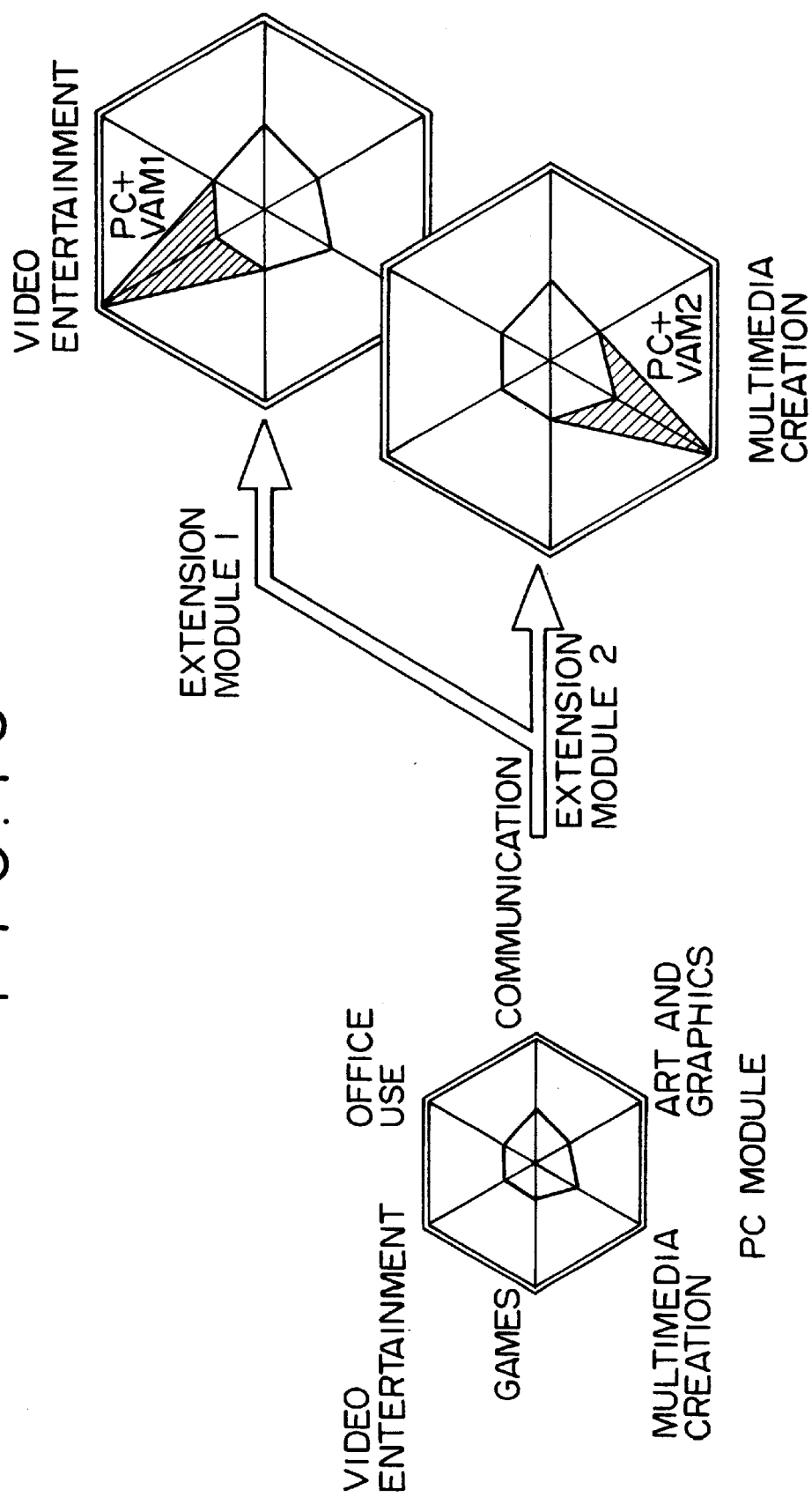
FIG. 16 is a diagram used for explaining functions of the PC module and other modules added thereto.

In addition, in this embodiment, since each piece of AV equipment, that is, each external electronic apparatus, is requested to carry out its respective unique processing, the PC module 1 can be configured as a computer including only very basic functions. That is to say, the performance level of the PC module 1 in a number of specific applications such as video entertainment, games, multimedia creation, art, graphics, communication and office courses shown in FIG. 16 is low. In comparison with the applications of an all in one personal computer shown in FIG. 17, the PC module 1 obviously has only very basic functions in each of the applications.

When using the AV system in the fields of video entertainment and multimedia creation, for example, modules each having an advanced function are purchased and connected to the PC module 1 by 1394 cables 6. Examples of such modules are a VAM 1 and a VAM 2 shown in FIG. 16 corresponding to the MPEG1 video module 2, the CD-ROM changer module 3, the DVD-ROM/movie player module 4 and the device-bay module 5 shown in FIG. 1, corresponding to the MPEG1 video module 2, the CD-ROM changer module 3, the DVD-ROM/movie player module 4 and the device-bay module 5 shown in FIG. 1. In this manner, in an all but irrelevant application, it is not necessary to provide an advanced function from the beginning, allowing the configuration of the PC module 1 to be made simple and thus, the cost thereof to be reduced. Then, by connecting a module having an advanced function in a certain application to the PC module 1, overall, an advanced AV system can be implemented in the application of interest to the user.

As a result, not only is it unnecessary to carry out operations to install software for newly added AV equipment but, when a module for adding a new function is purchased to replace an existing module of the previous generation, software (or a program) with a most recent version for controlling the new module is also stored in the module in advance, allowing the function of the new module to be prevented from becoming inoperative due to a version mismatch.

In addition, as a peripheral apparatus, the AV equipment can be configured to include embedded user interface information used for controlling the equipment, allowing the designer and/or the manufacturer of the peripheral apparatus, that is, the AV equipment in the case of the present embodiment, to display the originality thereof without being placed under restraint by functions of the PC module 1.

It should be noted that, while 1394 cables are employed as a home bus in the embodiment described above, other types of home bus can also be utilized as well.

In addition, as described above, AV equipment is used as peripheral apparatuses in the embodiment as an example. It is worth noting, however, that other types of electronic equipment can also be employed as well.

With the electronic equipment control apparatus and the electronic equipment control method provided according to one aspect of the present invention as described earlier, electronic equipment external to the electronic equipment control apparatus is requested to transmit user interface information required for controlling the equipment to the electronic equipment control apparatus. The user interface information transmitted in response to the request is then stored in the electronic equipment control apparatus. As a result, it is no longer necessary for the user to manually carry out operations to install the information in the electronic equipment control apparatus, enhancing the operability of the electronic equipment control apparatus. In addition, when new external electronic equipment is put to use, the electronic equipment control apparatus for controlling the electronic equipment is prevented from becoming obsolete only because the apparatus does not have the function for controlling the new electronic equipment.

In addition, with the electronic equipment and the electronic equipment control method provided according to the other aspect of the present as described earlier, in response to a request issued by the electronic equipment control apparatus, user interface information stored in advance in the electronic equipment is transmitted to the apparatus. As a result, electronic equipment which can be controlled by the electronic equipment control apparatus can be implemented without the need to install the information in the apparatus, allowing the originality of the electronic equipment to be displayed with ease. Furthermore, electronic equipment with the most recent function can be implemented without being placed under restraint by the version of the software on the electronic equipment control apparatus.

On the top of that, with the electronic equipment control apparatus and the electronic equipment control method provided according to a further aspect of the present invention as described earlier, user interface information stored in advance in a first piece of electronic equipment can be transferred to a second piece of electronic equipment to be stored therein, allowing a system with an advance function in an application of interest to the user to be implemented at a low cost.

What is claimed is:

1. An electronic equipment control apparatus for controlling one or more external electronic equipment connected to said electronic equipment control apparatus by communication lines, said apparatus comprising:

communication means for communication with said one or more external electronic equipment through said communication lines;

control means for controlling operations to request said one or more external electronic equipment to transmit and receive user interface information including a graphical representation of an equipment user interface for controlling said one or more external electronic equipment to said electronic equipment control apparatus; and storage means for storing said graphical representation transmitted by said one or more external electronic equipment through said communication lines;

wherein said control means of said electronic equipment control apparatus is configured to integrate and control the operation of each of said one or more external electronic equipment based on said received graphical representation such that said electronic equipment control apparatus constitutes means for processing said graphical representation to instruct said corresponding one or more external electronic equipment to perform an operation of said one or more external electronic equipment that is specified on said graphical representation.

2. The apparatus of claim 1 further comprising display control means for carrying out control to display said user interface information stored in said storage means.

3. The apparatus of claim 1 wherein said user interface information includes at least one of image data, layout information, a text and a program.

4. The apparatus of claim 1 wherein said external electronic equipment is AV equipment and said communication lines are an IEEE 1394 serial bus.

5. The apparatus of claim 1 wherein said control means makes a request for said user interface information at initialization.

6. The apparatus of claim 1 wherein said control means makes a request for said user interface information at a reset of said communication lines.

7. The apparatus of claim 1 wherein said control means makes a request for said user interface information at predetermined time intervals.

8. The apparatus of claim 1 wherein said control means makes a request for said user interface information from one of said one or more external electronic equipment when said external electronic equipment is selected.

9. The apparatus of claim 1 wherein said control means includes supplying means for supplying selection information selected from said user interface information received thereby to said external electronic equipment.

10. An electronic equipment control method for controlling one or more external electronic equipment connected to an electronic equipment control apparatus by communication lines, said method comprising:

requesting said one or more external electronic equipment to transmit user interface information including a graphical representation of an equipment user interface for controlling said one or more external electronic equipment to said electronic equipment control apparatus;

receiving said graphical representation transmitted by said one or more external electronic equipment through said communication lines; and storing said graphical representation received from said external electronic equipment;

wherein said control of said one or more external electronic equipment is integrated and operated by said electronic equipment control apparatus based on said received graphical representation such that said electronic equipment control apparatus constitutes means for processing said graphical representation to instruct said corresponding one or more external electronic equipment to perform an operation of said one or more external electronic equipment that is specified on said graphical representation.

11. The method of claim 10 further comprising the step of carrying out control to display said user interface information stored in said storing step.

12. The method of claim 10 wherein said user interface information includes at least one of image data, layout information, a text and a program.

13. The method of claim 10 wherein said external electronic equipment is AV equipment and said communication lines are an IEEE 1394 serial bus.

14. The method of claim 10 wherein, at said requesting step, a request for said user interface information is made at initialization.

15. The method of claim 10 wherein, at said requesting step, a request for said user interface information is made at a reset of said communication lines.

16. The method of claim 10 wherein, at said requesting step, a request for said user interface information is made at predetermined time intervals.

17. The method of claim 10 wherein, at said requesting step, a request for said user interface information from one of said one or more external electronic equipment is made when said external electronic equipment is selected.

18. The method of claim 10 wherein said requesting step has a supplying sub step of supplying selection information selected from said user interface information received at said requesting step to said external electronic equipment.

19. An electronic equipment connected to an electronic equipment control apparatus by a communication line, said equipment comprising:

communication means for carrying out communication with said electronic equipment control apparatus through said communication line;

storage means for storing user interface information including a graphical representation of an equipment user interface for controlling said electronic equipment; and control means for transmitting said graphical representation to said electronic equipment control apparatus when a request for transmission of said graphical representation is received from said electronic equipment control apparatus;

wherein when said control means transmits said graphical representation to said electronic equipment control apparatus, said electronic equipment control apparatus is configured to operate said electronic equipment based on said graphical representation received from said control means of said electronic equipment via said communication line such that said electronic equipment control apparatus constitutes means for processing said graphical representation to instruct said electronic equipment to perform an operation of said electronic equipment that is specified on said graphical representation.

20. The equipment of claim 19 wherein said control means determines processing for selection information of said user interface information when said selection information is received from said electronic equipment control apparatus.

21. The equipment of claim 20 wherein said control means executes said processing for said selection information after determining said processing.

22. An electronic equipment control method for controlling electronic equipment connected to an electronic equipment control apparatus by a communication line, said method comprising:

receiving a request for transmission of user interface information including a graphical representation of an equipment user interface required for controlling said electronic equipment from said electronic equipment control apparatus; and reading out said graphical representation from a storage means and transmitting said graphical representation to said electronic equipment control apparatus;

wherein when said graphical representation is transmitted to said electronic equipment control apparatus, said electronic equipment control apparatus is configured to operate said electronic equipment based on said graphical representation received such that said electronic equipment control apparatus constitutes means for processing said graphical representation to instruct said electronic equipment to perform an operation of said electronic equipment that is specified on said graphical representation.

23. The method of claim 22 further comprising the step of determining processing for selection information of said user interface information when receiving said selection information from said electronic equipment control apparatus.

24. The method of claim 23 further comprising the step of executing said processing for said selection information determined at said processing determining step.

25. An electronic equipment control apparatus comprising:

a first electronic equipment and a second electronic equipment connected to said first electronic equipment by a communication line and used for controlling said first electronic equipment, wherein:

a) said first electronic equipment comprises:

first communication means for carrying out communication with said second electronic equipment through said communication line;

first storage means for storing user interface information including a graphical representation of an equipment user interface required for controlling said first electronic equipment; and first transmission means for reading out said graphical representation from said first storage means and transmitting said graphical representation to said second electronic equipment when a request for transmission of said graphical representation is received from said second electronic equipment;

b) said second electronic equipment comprises:

second communication means for carrying out communication with said first electronic equipment through said communication line;

control means for requesting said first electronic equipment to transmit to said second electronic equipment said graphical representation required for controlling said first electronic equipment; and second storage means for storing said graphical representation transmitted by said first electronic equipment through said communication line; and c) when said first transmission means of said first electronic equipment transmits said graphical representation to said control means, said control means of said second electronic equipment is configured to control the operation of said first electronic equipment based on said graphical representation received from said first transmission means such that said second electronic equipment constitutes means for processing said graphical representation to instruct said first electronic equipment to perform an operation of said first electronic equipment that is specified on said graphical representation.

26. An electronic equipment control method for controlling an electronic equipment control apparatus comprising a first electronic equipment and a second electronic equipment connected to said first electronic equipment by a communication line and used for controlling said first electronic equipment, wherein:

a) in said first electronic equipment, said electronic equipment control method comprises:

a first communication step of carrying out communication with said second electronic equipment through said communication line;

a first storage step of storing user interface information including a graphical representation of an equipment user interface required for controlling said first electronic equipment; and a first transmission step of reading out said graphical representation from said first storage means and transmitting said graphical representation to said second electronic equipment when a request for transmission of said graphical representation is received from said second electronic equipment;

b) in said second electronic equipment, said electronic equipment control method comprises:

a second communication step of carrying out communication with said first electronic equipment through said communication line;

a request step of requesting said first electronic equipment to transmit said graphical representation required for controlling said first electronic equipment to said second electronic equipment; and a second storage step of storing said graphical representation transmitted by said first electronic equipment through said communication line; and c) when said graphical representation is transmitted to said second electronic equipment at said first transmission step, said electronic equipment control method in said second electronic equipment further includes controlling the operation of said first electronic equipment based on said graphical representation transmitted by said first electronic equipment such that said second electronic equipment constitutes means for processing said graphical representation to instruct said first electronic equipment to perform an operation of said first electronic equipment that is specified on said graphical representation.

27. An electronic equipment control apparatus for controlling one or more external electronic equipment connected to said electronic equipment control apparatus by communication lines, said apparatus comprising:

a communication unit for communication with said one or more external electronic equipment through said communication lines;

a controller for controlling operations to request said one or more external electronic equipment to transmit and receive user interface information including a graphical representation of an equipment user interface for controlling said one or more external electronic equipment to said electronic equipment control apparatus; and a storage unit for storing said graphical representation transmitted by said one or more external electronic equipment through said communication lines;

wherein said controller of said electronic equipment control apparatus is configured to integrate and control the operation of each of said one or more external electronic equipment based on said received graphical representation such that said electronic equipment control apparatus constitutes means for processing said graphical representation to instruct said corresponding one or more external electronic equipment to perform an operation of said one or more external electronic equipment that is specified on said graphical representation.

28. The apparatus of claim 27 further comprising a display controller for carrying out control to display said user interface information stored in said storage unit.

29. The apparatus of claim 28 wherein said user interface information includes at least one of image data, layout information, a text and a program.

30. The apparatus of claim 29 wherein said external electronic equipment is AV equipment and said communication lines are an IEEE 1394 serial bus.

31. The apparatus of claim 30 wherein said controller makes a request for said user interface information at initialization.

32. The apparatus of claim 31 wherein said controller makes a request for said user interface information at a reset of said communication lines.

33. The apparatus of claim 32 wherein said controller further includes a supply unit for supplying selection information selected from said user interface information received thereby to said external electronic equipment.

34. The apparatus of claim 31 wherein said controller makes a request for said user interface information at predetermined time intervals.

35. The apparatus of claim 34 wherein said controller further includes a supply unit for supplying selection information selected from said user interface information received thereby to said external electronic equipment.

36. The apparatus of claim 31 wherein said controller makes a request for said user interface information from one of said one or more external electronic equipment when said external electronic equipment is selected.

37. The apparatus of claim 36 wherein said controller further includes a supply unit for supplying selection information selected from said user interface information received thereby to said external electronic equipment.

38. The apparatus of claim 27 wherein said user interface information includes at least one of image data, layout information, a text and a program.

39. The apparatus of claim 38 wherein said external electronic equipment is AV equipment and said communication lines are an IEEE 1394 serial bus.

40. The apparatus of claim 39 wherein said controller makes a request for said user interface information at initialization.

41. The apparatus of claim 40 wherein said controller makes a request for said user interface information at a reset of said communication lines.

42. The apparatus of claim 41 wherein said controller further includes a supply unit for supplying selection information selected from said user interface information received thereby to said external electronic equipment.

43. The apparatus of claim 40 wherein said controller makes a request for said user interface information at predetermined time intervals.

44. The apparatus of claim 43 wherein said controller further includes a supply unit for supplying selection information selected from said user interface information received thereby to said external electronic equipment.

45. The apparatus of claim 40 wherein said controller makes a request for said user interface information from one of said one or more external electronic equipment when said external electronic equipment is selected.

46. The apparatus of claim 45 wherein said controller further includes a supply unit for supplying selection information selected from said user interface information received thereby to said external electronic equipment.

47. The apparatus of claim 27 wherein said external electronic equipment is AV equipment and said communication lines are an IEEE 1394 serial bus.

48. The apparatus of claim 47 wherein said controller makes a request for said user interface information at initialization.

49. The apparatus of claim 48 wherein said controller makes a request for said user interface information at a reset of said communication lines.

50. The apparatus of claim 49 wherein said controller further includes a supply unit for supplying selection information selected from said user interface information received thereby to said external electronic equipment.

51. The apparatus of claim 48 wherein said controller makes a request for said user interface information at predetermined time intervals.

52. The apparatus of claim 51 wherein said controller further includes a supply unit for supplying selection information selected from said user interface information received thereby to said external electronic equipment.

53. The apparatus of claim 48 wherein said controller makes a request for said user interface information from one of said one or more external electronic equipment when said external electronic equipment is selected.

54. The apparatus of claim 53 wherein said controller further includes a supply unit for supplying selection information selected from said user interface information received thereby to said external electronic equipment.

55. The apparatus of claim 27 wherein said controller makes a request for said user interface information at initialization.

56. The apparatus of claim 55 wherein said controller makes a request for said user interface information at a reset of said communication lines.

57. The apparatus of claim 56 wherein said controller further includes a supply unit for supplying selection information selected from said user interface information received thereby to said external electronic equipment.

58. The apparatus of claim 55 wherein said controller makes a request for said user interface information at predetermined time intervals.

59. The apparatus of claim 58 wherein said controller further includes a supply unit for supplying selection information selected from said user interface information received thereby to said external electronic equipment.

60. The apparatus of claim 55 wherein said controller makes a request for said user interface information from one of said one or more external electronic equipment when said external electronic equipment is selected.

61. The apparatus of claim 60 wherein said controller further includes a supply unit for supplying selection information selected from said user interface information received thereby to said external electronic equipment.

62. The apparatus of claim 27 wherein said controller makes a request for said user interface information at a reset of said control lines.

63. The apparatus of claim 62 wherein said controller further includes a supply unit for supplying selection information selected from said user interface information received thereby to said external electronic equipment.

64. The apparatus of claim 27 wherein said controller makes a request for said user interface information at predetermined time intervals.

65. The apparatus of claim 64 wherein said controller further includes a supply unit for supplying selection information selected from said user interface information received thereby to said external electronic equipment.

66. The apparatus of claim 27 wherein said controller makes a request for said user interface information from one of said one or more external electronic equipment when said external electronic equipment is selected.

67. The apparatus of claim 66 wherein said controller further includes a supply unit for supplying selection information selected from said user interface information received thereby to said external electronic equipment.

68. The apparatus of claim 27 wherein said controller further includes a supply unit for supplying selection information selected from said user interface information received thereby to said external electronic equipment.

* * * * *